United States Patent
Zveguintzoff et al.

(10) Patent No.: US 11,551,229 B2
(45) Date of Patent: Jan. 10, 2023

(54) PAYSLIP VERIFICATION FOR BLOCKCHAIN TRANSACTION

(71) Applicant: ADP, Inc., Roseland, NJ (US)

(72) Inventors: Gregoire Zveguintzoff, Limonest (FR); Dominique Rodier, Nanterre (FR); Gilbert Musnik, Nanterre (FR)

(73) Assignee: ADP, Inc., Roseland, NJ (US)

( * ) Notice: Subject to any disclaimer, the term of this patent is extended or adjusted under 35 U.S.C. 154(b) by 0 days.

(21) Appl. No.: 16/863,910

(22) PCT Filed: Feb. 5, 2019

(86) PCT No.: PCT/IB2019/000116
§ 371 (c)(1),
(2) Date: Apr. 30, 2020

(87) PCT Pub. No.: WO2020/161510
PCT Pub. Date: Aug. 13, 2020

(65) Prior Publication Data
US 2021/0365946 A1 Nov. 25, 2021

(51) Int. Cl.
*G06Q 20/40* (2012.01)
*G06Q 20/04* (2012.01)
*G06Q 20/10* (2012.01)

(52) U.S. Cl.
CPC ....... *G06Q 20/4016* (2013.01); *G06Q 20/042* (2013.01); *G06Q 20/102* (2013.01); *G06Q 2220/00* (2013.01)

(58) Field of Classification Search
None
See application file for complete search history.

(56) References Cited

U.S. PATENT DOCUMENTS

| 6,411,938 | B1 * | 6/2002 | Gates | G06Q 40/12 705/45 |
| 7,761,370 | B1 * | 7/2010 | Hicks | G06Q 40/02 705/38 |
| 8,688,579 | B1 * | 4/2014 | Ethington | G06Q 20/042 705/42 |
| 10,423,938 | B1 * | 9/2019 | Gaeta | G06Q 20/042 |
| 2009/0119190 | A1 * | 5/2009 | Realini | G06Q 20/04 705/30 |
| 2017/0111175 | A1 * | 4/2017 | Oberhauser | G11B 20/00086 |

(Continued)

OTHER PUBLICATIONS

Author Unknown, Pay Stub Example, Feb. 1, 2019, retrieved https://www.paycor.com/resource-center/hr-glossary/pay-stub-example/#:~:text=A%20pay%20stub%20is%20part,stubs%20are%20becoming%20more%20prevalent. (Year: 2019).*

(Continued)

*Primary Examiner* — Gregory S Cunningham, II
(74) *Attorney, Agent, or Firm* — Yee & Associates, P.C.

(57) ABSTRACT

A computer-implemented method, system, and computer program product for reducing fraud based on a forged or altered payslip. A blockchain is configured for recording transactions. A payslip is prepared having information regarding an employee. At least one hash is provided for a portion of the information. The at least one hash and the portion of the information is recorded in the blockchain as a blockchain transaction. A barcode is configured to act as a pointer for locating the blockchain transaction. The barcode is inserted into a barcode location on the payslip. The payslip is delivered to the employee.

11 Claims, 16 Drawing Sheets

(56) References Cited

U.S. PATENT DOCUMENTS

2018/0227130 A1    8/2018  Ebrahimi et al.
2018/0276745 A1*   9/2018  Paolini-Subramanya ...................
                                                    G06Q 50/18
2019/0340584 A1*  11/2019  Arora ................ G06Q 20/3276

OTHER PUBLICATIONS

Nortbert Erts, Blockchain in HR: 8 Ways Blockchain will Impact the HR Function, Oct. 28, 2018, entire document pertinent, retrieved from https://blog.sage.hr/blockchain-in-hr-8-ways-blockchain-will-impact-the-hr-function/ (Year: 2018).*
Vericdoc Global Whitepaper, Aug. 31, 2018, pp. 1-22, CP055596629, www: https://www.veridocglobal.com/Themes/Veridoc/Content/pdf/VeriDocGlobal-whitepaper2.2.pdf.
Search Report and Written Opinion of the International Searching Authority dated Jul. 30, 2019, regarding International Application No. PCT/IB2019/000116, 13 pages.

* cited by examiner

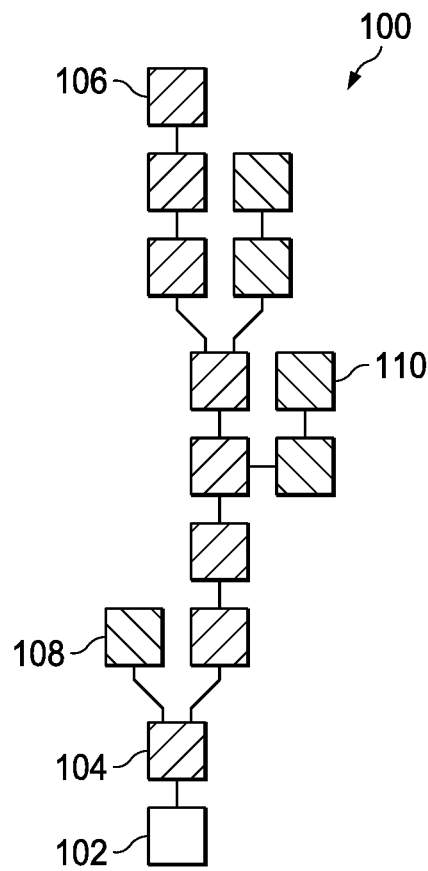
FIG. 1
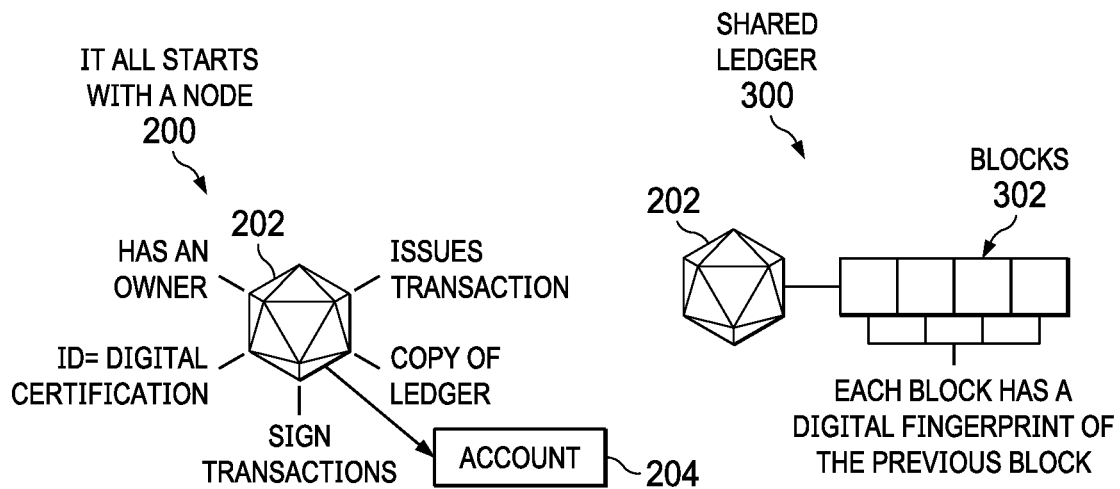
FIG. 2
FIG. 3

PAYSLIP VERIFICATION FOR BLOCKCHAIN TRANSACTION

CROSS-REFERENCE TO RELATED APPLICATIONS

This application claims priority under 35 U.S.C. § 371 to International Application No. PCT/IB2019/000116 filed Feb. 5, 2019. The contents of the aforementioned application are incorporated herein by reference.

BACKGROUND INFORMATION

1. Field

The present disclosure relates generally to an improved computer system and, in particular, to a method and apparatus for verifying a payslip by scanning a barcode in the payslip to access at least one hash in a blockchain transaction.

2. Background

Payslips present a tangible record of an employee's earnings. A current payslip therefore may be relied upon to provide a record of recent earnings, and as such, a payslip is often used by lenders to determine whether to make a loan or to determine an amount of a loan. However, a printed payslip may be forged or altered. Indeed, a printed payslip may be forged by any ill-intentioned person with minimal skills. Moreover, a digital payslip may be forged or altered as well. Use of a forged or altered payslip may have a negative impact on the image of the employer issuing the original payslip.

A distributed ledger, as used throughout this document, refers to a computer-only technology that enables the distributed recordation of transactions through a distributed ledger maintained by a network of computers. A blockchain is an example of a distributed ledger. BITCOIN® is an example of blockchain technology application.

A blockchain is a type of distributed ledger, which includes digitally recorded, unmodifiable data in packages called blocks. A distributed ledger is a consensus of replicated, shared, and synchronized digital data geographically spread across multiple computers which may be in different sites, countries, and/or institutions maintained by many different parties. A distributed ledger can be public, such as BITCOIN®, where there is no limitation on who may participate in the network, or private, where only approved parties are permitted to participate in the network.

Data privacy is essential to production of data regarding an employee. Current known attempts at document verification use personal information of the employee. A need exists for document verification that does not provide any personal information of the employee.

Therefore, it would be desirable to have a method and apparatus that take into account at least some of the issues discussed above, as well as other possible issues. For example, it would be desirable to have a method and apparatus that would provide verification of a payslip using blockchain technology.

SUMMARY

An embodiment of the present disclosure provides a computer-implemented method for reducing fraud based on a forged or altered payslip. The computer-implemented method comprises: configuring a blockchain for recording transactions; preparing a payslip, the payslip having information regarding an employee; providing at least one hash for a portion of the information; recording the at least one hash and the portion of the information in the blockchain as a blockchain transaction; configuring a barcode as a pointer for locating the blockchain transaction; inserting the barcode into a barcode location on the payslip; and delivering the payslip to the employee.

Another embodiment of the present disclosure provides a computer-implemented method for reducing fraud based on a forged or altered payslip. The computer-implemented method comprises: uploading a payslip to a website; responsive to receiving the payslip, extracting a number of segments of information from the payslip; responsive to extracting the number of segments of information, comparing the number of segments of information to corresponding information in a database; and responsive to comparing the number of segments of information to the corresponding information in the database, determining whether the number of segments of information match the corresponding information in the database; responsive to the number of segments of information matching the corresponding information in the database, delivering a first message to the website; or responsive to the number of segments of information not matching the corresponding information in the database, delivering a second message to the website; wherein the first message verifies that the payslip is a genuine payslip; and wherein the second message informs a requestor to check the payslip.

Yet another embodiment provides a computer system connected to a blockchain and to a verification website; program code stored in a computer-readable storage medium and configured to cause a processor unit to configure the blockchain for recording transactions; to prepare a payslip, the payslip having information regarding an employee; to provide at least one hash for a portion of the information; to record the at least one hash and the portion of the information in the blockchain as a blockchain transaction; responsive to configuring a barcode as a pointer for locating the blockchain transaction, to insert the barcode into a barcode location on the payslip; deliver the payslip to the employee; responsive to a requestor accessing the verification website to make a request for verification, to provide requested information to the verification website in accordance with website instructions; to calculate, by a verification algorithm running on a processor, a request hash for the requested information; responsive to a scan of the barcode location on the payslip, to access the at least one hash in the blockchain transaction; and responsive to accessing the at least one hash in the blockchain transaction, to compare the request hash to the at least one hash in the blockchain transaction.

Another embodiment comprises a computer program product for reducing fraud based on a forged or altered payslip. The computer program product comprises program code stored in a computer-readable storage medium and configured to cause a processor unit to configure a blockchain for recording transactions; program code stored in the computer-readable storage medium and configured to cause the processor unit to prepare a payslip, the payslip having information regarding an employee; program code stored in the computer-readable storage medium and configured to cause the processor unit to provide at least one hash for a portion of the information; program code stored in the computer-readable storage medium and configured to cause the processor unit to record the at least one hash and the portion of the information in the blockchain as a blockchain transaction; program code stored in the computer-readable storage medium and configured to cause the processor unit to configure aa barcode as a pointer for locating the blockchain transaction; program code stored in the computer-readable storage medium and configured to cause the processor unit, to insert the barcode into a barcode location on the payslip; and program code stored in the computer-readable storage medium and configured to cause the processor unit to deliver the payslip to the employee.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

FIG. 1 is an illustration of a distributed ledger in a form of a blockchain in accordance with an illustrative embodiment;

FIG. 2 is a block diagram illustrating a first step in creating a blockchain in accordance with an illustrative embodiment;

FIG. 3 is a block diagram illustrating a second step in creating a blockchain in accordance with an illustrative embodiment;

DETAILED DESCRIPTION

Figure 4:
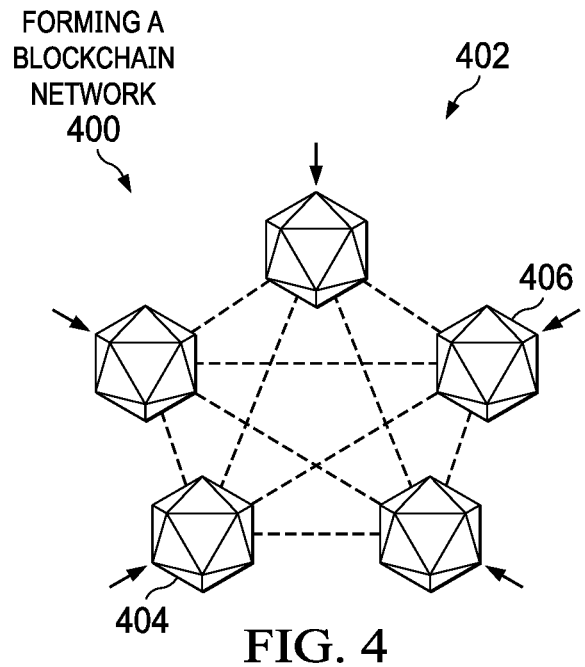
FIG. 4 is a block diagram illustrating a third step in creating a blockchain in accordance with an illustrative embodiment.

The illustrative embodiments recognize and take into account one or more different considerations. The illustrative embodiments recognize and take into account that a QR® code may be inserted onto a payslip. A QR® code is a registered trademark for a type of matrix barcode or two-dimensional barcode. A matrix barcode may be inserted onto a location on a payslip. For example, a matrix barcode may be inserted on the top right-hand corner of payslip.

The illustrative embodiments recognize and take into account that the matrix barcode may contain a pointer, and an entity preparing a payslip for an employee may host a website at the pointer for the website. Such a matrix barcode may not contain any personal data of the employee, but only the pointer including a uniquely attributed token.

The illustrative embodiments recognize and take into account that scanning a payslip with an embedded matrix barcode and pointer may present a web interface to a requestor who scanned the payslip. The web interface may ask the requestor to provide one or more numbers from the payslip such as net pay, gross pay, or tax withholding. Fields in the web interface may correspond to non-personal data on the printed or digital payslip. Non-personal data on the printed or digital payslip may be entered into fields on the web site. Responsive to matching the entered data with the original data in the database, a verification message may be delivered to the requestor.

The illustrative embodiments recognize and take into account that a pay-per-use service may be provided for professionals such as mortgage brokers. Moreover, additional services may be provided. For example, a history of verification may be provided. Moreover, verification by uploading of the payslip may be provided in which the entire payslip may be validated by comparing sectors of the payslip. For example, such a service would be helpful when the payslip did not have an embedded matrix barcode and pointer, or when the matrix barcode has been damaged by handling, overwriting, or spillage. In such an embodiment providing for uploading, a name of an employee may be provided as well as a name of the requestor.

The illustrative embodiments recognize and take into account that data privacy plays an important role in data practice. At least one hash code may be used to code payslip data and the at least one hash code may be used as a token for the matrix barcode without including any personal information.

The illustrative embodiments recognize and take into account that at least one hash code along with non-personal data related code may be published in a publicly available blockchain for verification of a payslip. When a barcode, embedded in a payslip, is scanned, an encoded hash code may be compared to at least one hash code stored in the publicly available blockchain to quickly yield a "yes" or "no" authentication without further processing. Moreover, such a matrix barcode using coded hash verification on a blockchain may be used to verify many different kinds of paper documents using blockchain technology without compromising any personal information.

The illustrative embodiments recognize and take into account that distributed ledgers may take advantage of other cryptographic techniques. Another technique is known as hashing. A cryptographic hash is like a signature for a text of a data file. The secure hash algorithm (SHA) is one of a number of cryptographic hash functions. For example, the SHA-256 algorithm generates an almost-unique, fixed size 256-bit (32 byte) hash for any length of text or images. Additionally, the SHA-256 algorithm can generate a fixed size 256-bit (32 byte) hash for the entire Library of Congress just as it would for someone's social security number. At least one hash operation is a one-way function, meaning it cannot be decrypted back.

The illustrative embodiments recognize and take into account that verifiable yet non-personal payroll information may be stored in an encrypted form on the blockchain or stored off the blockchain at a secured web location. When stored off the blockchain, the payroll information can be accessed through a pointer from a URL stored in a QR® code or a pointer in the blockchain transaction for the issuance of a payslip.

The illustrative embodiments recognize and take into account that if only trusted ledger owners or actors can maintain the integrity of the ledger, usually by some kind of validation process, then a permissioned, public shared ledger may be used. This type of ledger is a distributed ledger.

Thus, in one illustrative embodiment, one or more technical solutions are present that overcome a technical problem in the area of payslip verification because the illustrative embodiments are faster than current systems and methods, and thereby save time and reduce resources necessary to accurately perform verification of a document such as a payslip.

As used herein, "resources" shall mean one or more of the following: (1) the amount of time to, (2) the amount of processor time and internet bandwidth used to, (3) the amount of memory and storage required for, and (4) the amount of processor time to prepare one or both of a validated address and a validated address list. A reduction in processor time may be a reduction in an amount of time that processor unit 2104 in FIG. 21 spends executing instructions for one or more functional components of payslip verification program 1330 in FIG. 13, and for executing instructions for the processes set forth in FIG. 17 through FIG. 20 compared to current methods of payslip verification. The reduction in memory and storage may be a reduction in an amount of memory and storage in memory 2106 and persistent storage 2104 in FIG. 21 compared to current methods of payslip verification. Moreover, the reduction in storage may be a reduction in program code 2118 stored in computer-readable storage media 2124, and computer-readable signal media 2126 in FIG. 21.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step. For example, one or more of the blocks may be implemented as program code.

In some alternative implementations of an illustrative embodiment, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added, in addition to the illustrated blocks, in a flowchart or block diagram.

As used herein, the phrase "at least one of," when used with a list of items, means different combinations of one or more of the listed items may be used and only one of each item in the list may be needed. In other words, "at least one of" means any combination of items and number of items may be used from the list, but not all of the items in the list are required. The item may be a particular object, thing, or a category. In the illustrative examples, the same reference numeral may be used in more than one figure. This reuse of a reference numeral in different figures represents the same element in the different figures.

For example, without limitation, "at least one of item A, item B, or item C" may include item A, item A and item B, or item B. This example also may include item A, item B, and item C or item B and item C. Of course, any combinations of these items may be present. In some illustrative examples, "at least one of" may be, for example, without limitation, two of item A, one of item B, and ten of item C; four of item B and seven of item C; or other suitable combinations.

The illustrative embodiments recognize and take into account that smart contracts on blockchains have not been used to verify payslips. In other words, so far, no one has attempted or designed a payslip verification system that utilizes the underlying technology of blockchains and smart contracts to create an open and secure payroll verification system.

The illustrative embodiments recognize and take into account that a computer-implemented method, system, and computer program product for payslip verification may configure a web site for payslip verification of an employee's payslip. The web site may be hosted by an entity providing payroll services to the employee. An amount of payslip fraud based on forged or altered payslips may be reduced.

FIG. 1 is a block diagram of a distributed ledger in the form of a blockchain depicted in accordance with an illustrative embodiment. Blockchain 100 is a blockchain, which is a specific implementation of a distributed ledger. Blockchain 100 is described to introduce blockchain concepts.

Blockchain 100 starts with genesis block 102. Blocks indicated with a right-leaning hash, such as block 104 or block 106, are part of the main chain. Blocks with a left-leaning hash, such as block 108 or block 110, exist outside of blockchain 100.

Thus, blockchain 100 is a heaviest path from genesis block 102, or root block, to block 106, or leaf block, through the entire block tree. The "heaviest" path through the block tree, i.e. the path that has had the most computation done upon it, is conceptually identified as blockchain 100. Identifying blockchain 100 in this manner allows a decentralized consensus to be achieved for the state of blockchain 100.

Stated more formally, a blockchain is a distributed database that maintains a continuously growing list of ordered records called blocks. Each block contains a timestamp and a link to a previous block, with the at least one hash of the prior block linking the two. By design, blockchains are inherently resistant to modification of the data because, once recorded, the data in a block cannot be altered retroactively. Through the use of a peer-to-peer network and one or more distributed timestamping servers, a blockchain database may be managed autonomously. Thus, blockchains may be used to provide an open, distributed ledger that can record transactions between parties efficiently and in a verifiable and permanent way.

Distributed ledgers, and blockchains in particular, are secure by design. Blockchains have a high byzantine fault tolerance. Thus, a decentralized consensus can be achieved with a blockchain. The first blockchain was created by Satoshi Nakamoto in 2008 and implemented the following year as a core component of the digital currency BITCOIN®, where it serves as the public ledger for all transactions. BITCOIN® was the first digital currency to solve the double spending problem, without the use of a trusted authority or central server.

Figure 5:
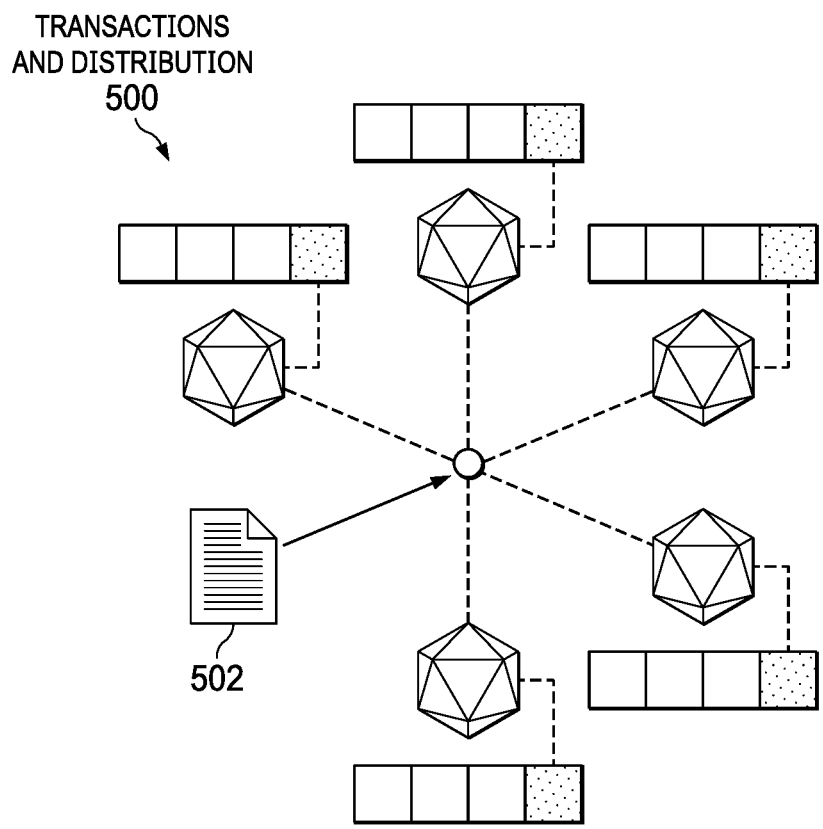
FIG. 5 is a block diagram illustrating a fourth step in creating a blockchain in accordance with an illustrative embodiment.
Figure 6:
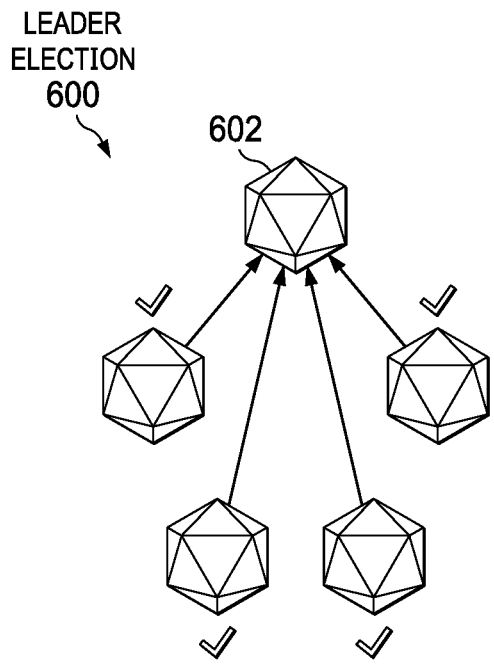
FIG. 6 is a block diagram illustrating a fifth step in creating a blockchain in accordance with an illustrative embodiment.
Figure 7:
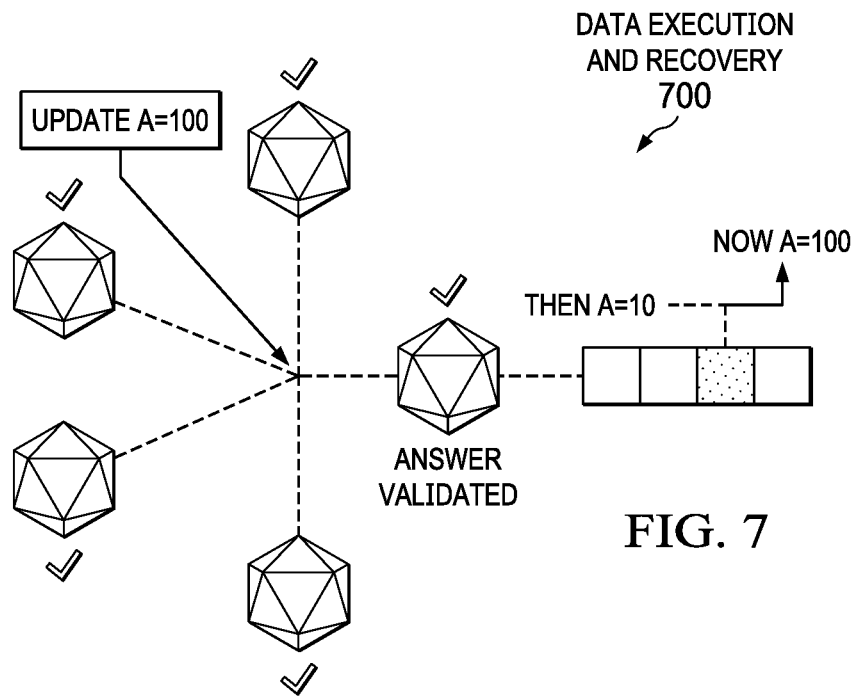
FIG. 7 is a block diagram illustrating a sixth step in creating a blockchain in accordance with an illustrative embodiment.

FIG. 2 through FIG. 7 should be considered together. FIG. 2 is a block diagram illustrating a first step in creating a blockchain in accordance with an illustrative embodiment. FIG. 3 is a block diagram illustrating a second step in creating a blockchain in accordance with an illustrative embodiment. FIG. 4 is a block diagram illustrating a third step in creating a blockchain in accordance with an illustrative embodiment. FIG. 5 is a block diagram illustrating a fourth step in creating a blockchain in accordance with an illustrative embodiment. FIG. 6 is a block diagram illustrating a fifth step in creating a blockchain in accordance with an illustrative embodiment. FIG. 7 is a block diagram illustrating a sixth step in creating a blockchain in accordance with an illustrative embodiment. FIG. 2 through FIG. 7 may be implemented on a computer or on multiple computers in a network environment. FIG. 2 through FIG. 7 address a technical problem that only exists in computer programming and execution. As used throughout FIG. 2 through FIG. 7, common reference numerals refer to common objects in these figures.

In operation 200 shown in FIG. 2, node 202 creates account 204 that contains initial data for blockchain 100 in FIG. 1. Account 204 is a state object recorded in a shared ledger that represents an identity of agents that can interact with the ledger. Account 204 includes an owner, a digital certificate identification, and a copy of a ledger. Node 202 may issue transactions from account 204 for interacting with the blockchain. Node 202 may sign transactions and inspect the blockchain and its associated state. The state of the blockchain is the combined state of all nodes that have interacted with the blockchain. Node 202 may issue transactions from account 204 for interacting with the blockchain.

In operation 300 shown in FIG. 3, node 202 collates transactions and distributions into blocks 302, and adds blocks 302 to the shared ledger. Blocks 302 function as a journal, recording a series of transactions together with the previous block and an identifier for the final state of the blockchain. Blocks 302 are chained together using a cryptographic hash as a means of reference—each block in the shared ledger has a digital fingerprint of the previous block. In this manner, it is not possible to alter previous blocks without being detected.

In operation 400 shown in FIG. 4, blockchain network 402 is formed. Blockchain network 402 may include multiple blockchains such as those shown in FIG. 2 or FIG. 3. Each node, such as node 404 or node 406, has its own blockchain.

In operation 500 shown in FIG. 5, transaction 502 is issued from an account, such as account 204 in FIG. 2. Transaction 502 is an instruction constructed by a node, such as node 202 in FIG. 2, and cryptographically-signed by an account, such as account 204.

There are two types of transactions: transactions that result in message calls, and transactions that result in a creation of new agent accounts, i.e., "contract creation" transactions. Transactions that result in message calls contain data specifying input data for the message.

Transactions and distributions are collated into blocks that are added to the blockchain by the various nodes. The blockchain is synchronized across the various nodes. Thus, each node in blockchain network 402 adds identical blocks to a local copy of the blockchain.

In operation 600 shown in FIG. 6, leader election takes place. In this operation, leader node 602 is elected. Leader node 602 takes priority for deciding which information is the most accurate or up-to-date. Identifying information by leader node 602, and validating this information by other nodes, allows a decentralized consensus to be achieved throughout the network for the state of blockchain 100 in FIG. 1.

In operation 700 shown in FIG. 7, data execution and recovery take place. A query regarding data stored in one or more of the nodes may return a validated answer regarding contents in the blocks.

Figure 8:
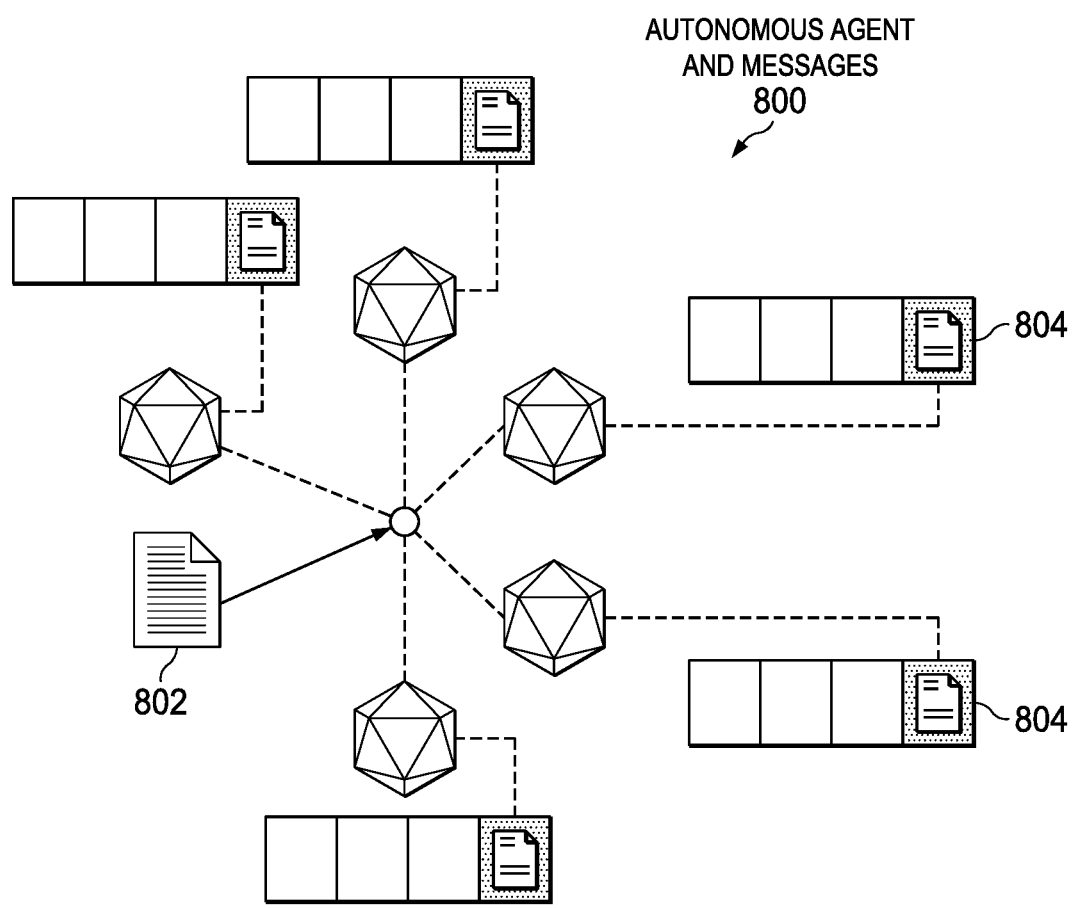
FIG. 8 is a block diagram illustrating creation of a smart contract in accordance with an illustrative embodiment.
Figure 9:
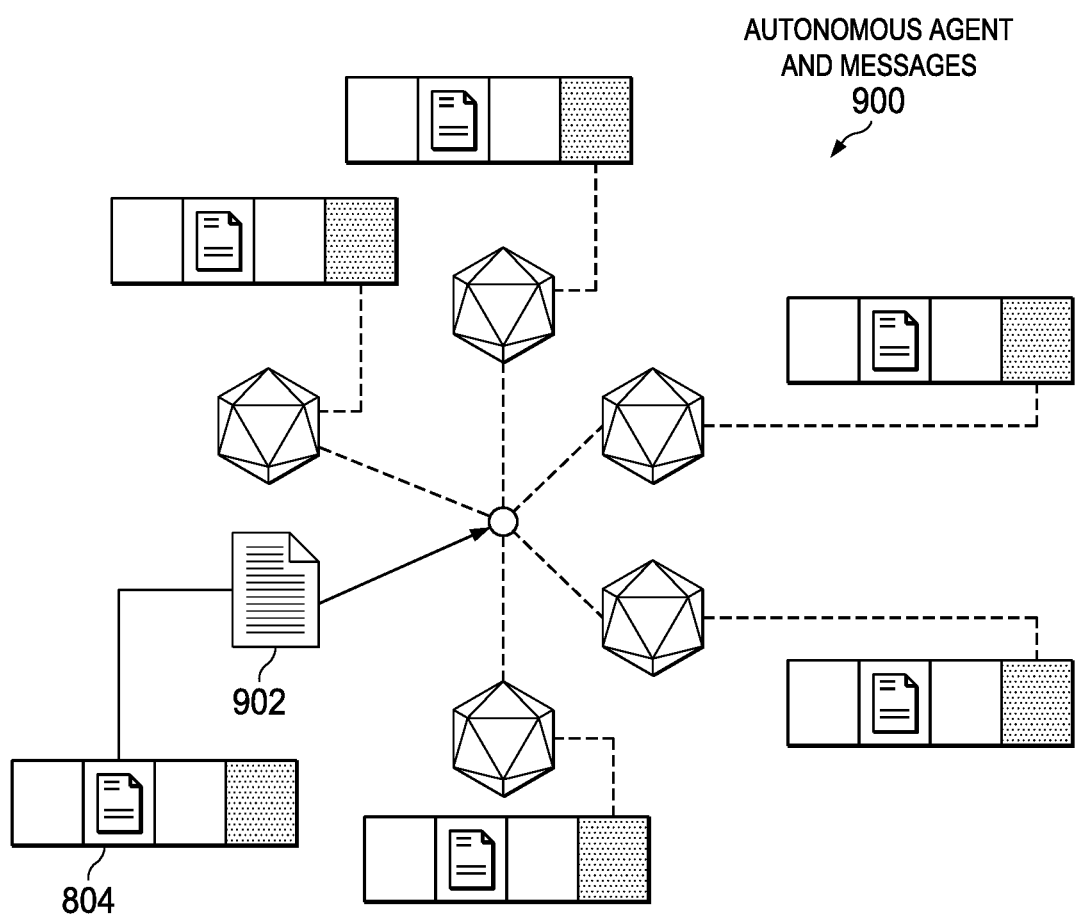
FIG. 9 is a block diagram illustrating operation of a smart contract in accordance with an illustrative embodiment.

FIG. 8 and FIG. 9 should be considered together. FIG. 8 is a block diagram illustrating a step in creating a blockchain having a smart contract therein in accordance with an illustrative embodiment. FIG. 9 is a block diagram illustrating a step in creating a blockchain using a smart contract within a blockchain in accordance with an illustrative embodiment. FIG. 8 and FIG. 9 may be implemented on a computer or on multiple computers in a network environment.

In operation 800 shown in FIG. 8, transaction 802 and distributions are added to the various nodes. Thus, blocks are added to each node. As indicated above, there are two types of transactions: transactions that result in message calls, and transactions that result in the creation of new agent accounts.

Transaction 802 is a cryptographically-signed instruction constructed by a node, such as node 202 in FIG. 2. Transaction 802 results in the creation of smart contract 804. In contrast to data contained in message call transactions, such as transaction 502 in FIG. 5, transaction 802 contains data specifying initialization code for smart contract 804. Each node in a blockchain network executes this initialization code to incorporate smart contract 804 into the blockchain. In this illustrative example, the initialization code is executed at account creation and discarded immediately thereafter. The initialization code retrieves a second code fragment that executes each time the account receives a message call (either through a transaction or due to the internal execution of code).

Smart contract 804 is a type of account that is stored on the blockchain; it is a collection of code, i.e. functions, and data, i.e. state, that resides at a specific address on the blockchain. Smart contract 804 is not associated with an external node, but rather is a notional object existent only within the blockchain execution environment. Smart contract 804 has direct control over its own state and storage memory to preserve persistent state variables. When referenced by a message or transaction, smart contract 804 executes its associated functions.

In operation 900 shown in FIG. 9, smart contract 804 generates message 902. In a contract account, every time the contract account receives a message, its code activates. Message 902 is an instruction constructed by smart contract 804 in response to receiving a message. Message 902 is a sort of "virtual transaction" sent by code from one account to another. Message 902 can specify input data that results in message calls for other accounts, allowing smart contract 804 to read and write to internal storage. Alternatively, message 902 can contain data specifying initialization code, allowing smart contract 804 to create additional smart contracts.

In this illustrative example, code for smart contract 804 can be executed as part of state transition and block validation. If a transaction is added into a block, the code execution spawned by that transaction will be executed by all nodes that download and validate the block.

Figure 10:
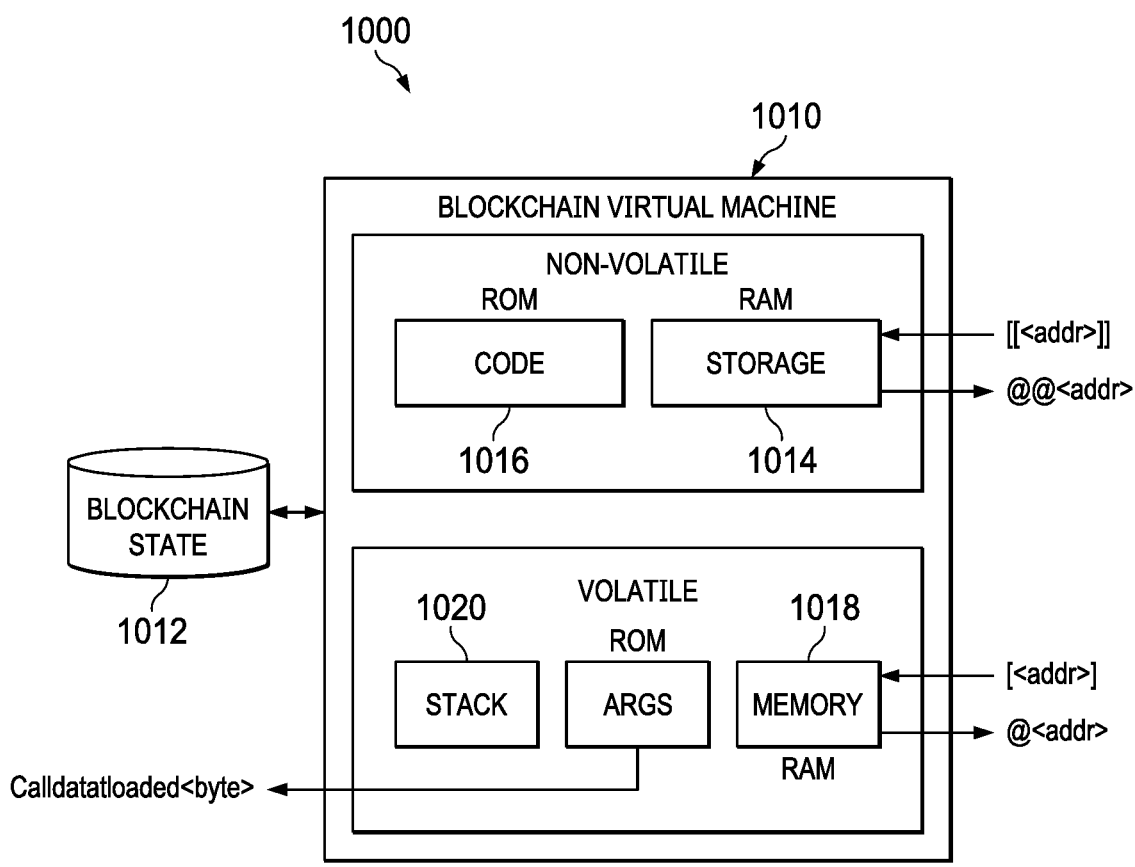
FIG. 10 is an illustration of an execution environment for executing a smart contract stored on a blockchain in accordance with an illustrative embodiment.

With reference next to FIG. 10, an illustration of an execution environment for executing a smart contract stored on the blockchain is depicted in accordance with an illustrative embodiment.

Blockchain environment 1000 includes a number of different components. As depicted, blockchain environment 1000 includes blockchain virtual machine 1010 and blockchain state 1012.

Blockchain virtual machine 1010 is responsible for internal account state and transaction computation for the blockchain. Blockchain virtual machine 1010 performs state transitions for smart contracts. In this illustrative example, blockchain virtual machine 1010 has a stack-based architecture that uses a last-in, first-out stack. Blockchain virtual machine 1010 executes transactions recursively, computing the system state and the machine state for each loop. Blockchain virtual machine 1010 includes non-volatile and volatile components.

Storage 1014 is non-volatile and is maintained on the blockchain as part of the system state. Every smart contract on the blockchain has its own storage. Storage 1014 preserves all the state variables for the smart contract that do not change between the function calls.

Code 1016 are instructions that formally specify the meaning and ramifications of a transaction or message to an account. Blockchain virtual machine 1010 executes code 1016 in response to receiving a message call. In contrast to standard architecture where program code is stored in generally-accessible memory, code 1016 is stored separately in a virtual ROM that cannot be changed after construction.

Memory 1018 is volatile and is cleared between external function calls. Memory 1018 stores temporary data; for instance, function arguments, local variables, and storing return values. Stack 1020 is used to hold temporary values when conducting calculations in blockchain virtual machine 1010.

Blockchain environment 1000 includes blockchain state 1012. Blockchain virtual machine 1010 relies on blockchain state 1012 for execution of certain instructions. Blockchain state 1012 can include a mapping between blockchain addresses, i.e., accounts and account states. Blockchain state 1012 may not be stored on the blockchain, but rather in a data structure on a backend state database that maintains the mapping.

Figure 11:
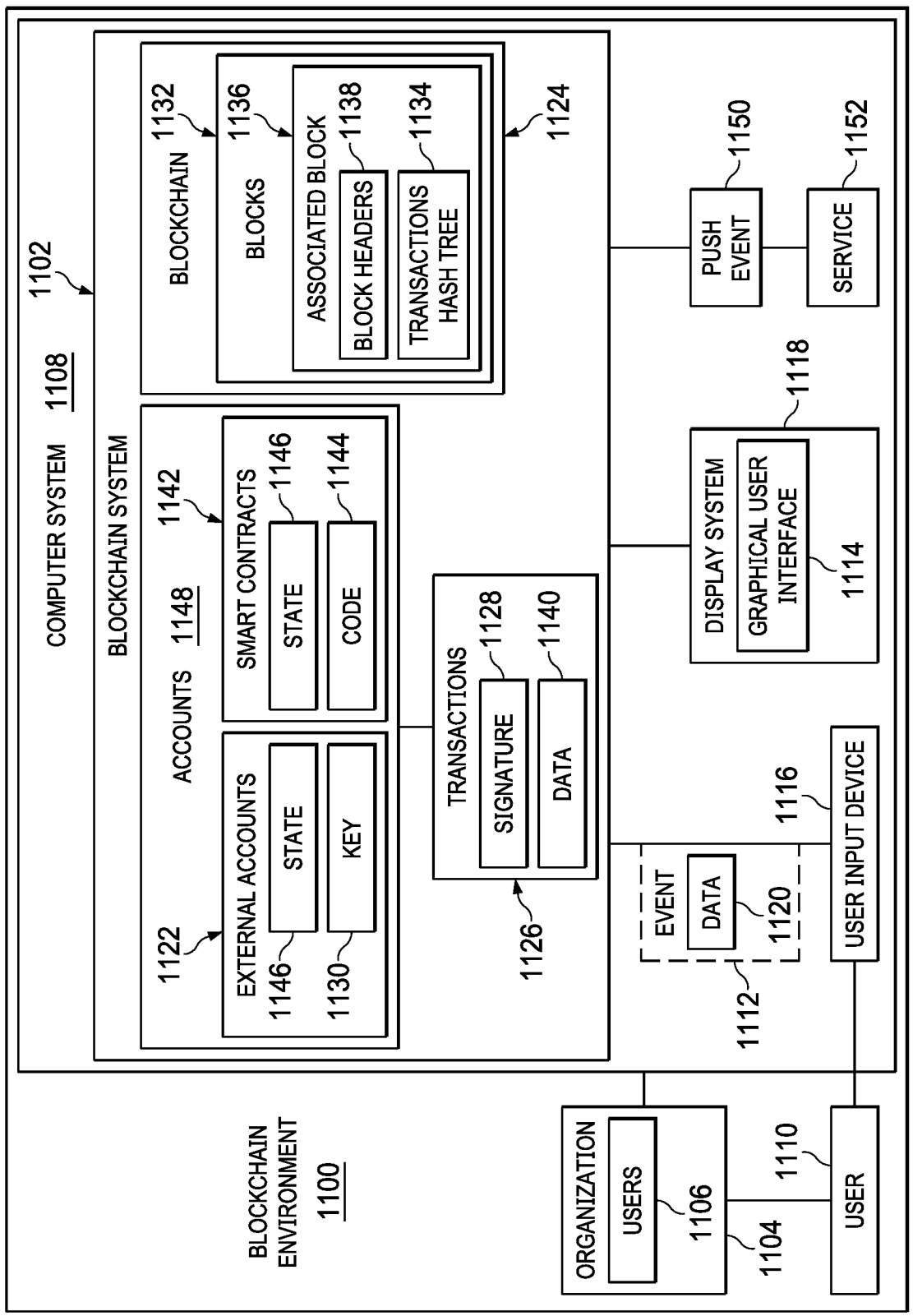
FIG. 11 is a block diagram of an information environment in accordance with an illustrative embodiment.

With reference now to FIG. 11, a block diagram of a blockchain payslip verification environment is depicted in accordance with an illustrative embodiment. As depicted, blockchain environment 1100 includes blockchain system 1102.

In this illustrative example, blockchain system 1102 manages payslip verification events such as event 1112 for organization 1104. Organization 1104 may be, for example, a corporation, a partnership, a charitable organization, a city, a government agency, or some other suitable type of organization. Organization 1104 can encompass people who are employed by or associated with organization 1104, such as users 1106.

In this illustrative example, blockchain system 1102 is implemented in computer system 1108. Computer system 1108 is a physical hardware system and includes one or more data processing systems. When more than one data processing system is present, those data processing systems may be in communication with each other using a communications medium. The communications medium may be a network. The data processing systems may be selected from at least one of a computer, a server computer, a workstation, a tablet computer, a laptop computer, a mobile phone, or some other suitable data processing system. The network of data processing systems are nodes within blockchain system 1102.

Blockchain system 1102 may be implemented in software, hardware, firmware, or a combination thereof. When software is used, the operations performed by blockchain system 1102 may be implemented in program code configured to run on hardware, such as a processor unit. When firmware is used, the operations performed by blockchain system 1102 may be implemented in program code and data and stored in persistent memory to run on a processor unit. When hardware is employed, the hardware may include circuits that operate to perform the operations in blockchain system 1102.

In the illustrative examples, the hardware may take the form of a circuit system, an integrated circuit, an application-specific integrated circuit (ASIC), a programmable logic device, or some other suitable type of hardware configured to perform a number of operations. With a programmable logic device, the device may be configured to perform the number of operations. The device may be reconfigured at a later time or may be permanently configured to perform the number of operations. Programmable logic devices include, for example, a programmable logic array, programmable array logic, a field programmable logic array, a field programmable gate array, and other suitable hardware devices. Additionally, the processes may be implemented in organic components integrated with inorganic components and may be comprised entirely of organic components, excluding a human being. For example, the processes may be implemented as circuits in organic semiconductors.

In this illustrative example, blockchain system 1102 tracks payslip verifications for users 1106 of organization 1104. User 1110, who can be one of users 1106, may record a payslip verification in blockchain system 1102 by submitting event 1112. Event 1112 can be a scan of a barcode on a payslip provided to user 1110. User 1110 may request a payslip verification service by user input to graphical user interface 1114 using one or more of user input device 1116, such as a keyboard, a mouse, a graphical user interface (a physical display), a touch screen, a voice interaction, and any other suitable interface for interacting with the computer. Event 1112 can be a scan of a barcode in the payslip using user input device 1116.

In one illustrative example, blockchain system 1102 displays graphical user interface 1114 on display system 1118.

Display system 1118 can be a group of display devices. A display device in display system 1118 may be selected from one of a liquid crystal display (LCD), a light-emitting diode (LED) display, an organic light-emitting diode (OLED) display, and other suitable types of display devices.

Blockchain system 1102 receives a payslip verification event such as event 1112. Event 1112 identifies an account of user 1110 in blockchain system 1102. In this illustrative example, event 1112 includes data 1120. Data 1120 can include a barcode that is associated with one of external accounts 1122 associated with user 1110.

In one illustrative example, user input device 1116 can be a mobile device. Blockchain system 1102 receives event 1112 from a mobile device associated with blockchain system 1102. In this illustrative example, data 1120 of event 1112, such as a payslip verification, includes location data that identifies a geographical location of the mobile device. Data 1120 of event 1112 includes a current payslip verification.

External accounts 1122 are examples of accounts 204 shown in block form in FIG. 2. External accounts 1122 allow external actors, such as user 1110, to interact with blockchain 1124 by issuing transactions 1126.

Transactions 1126 submitted from external accounts 1122 are cryptographically-signed by a respective account. For example, signature 1128 uniquely identifies key 1130 of the particular account that issues transactions 1126. For example, based on signature 1128 identifying a particular one of external accounts 1122, blockchain system 1102 is able to uniquely identify which of users 1106 issues transactions 1126.

Blockchain system 1102 records event 1112 in blockchain 1124. Event 1112 is submitted to, and recorded in, blockchain system 1102 as one of transactions 1126 submitted from one of external accounts 1122. Blockchain system 1102 records transactions 1126 in blocks 1132 of blockchain 1124.

Each of transactions 1126 is hashed and stored in transactions hash tree 1134 of associated block 1136. All of the transaction hashes in transactions hash tree 1134 are themselves hashed and stored as a root hash as part of block headers 1138.

In this illustrative example, transactions 1126 issued by external accounts 1122 can include data 1140. Data 1140 specifies input data for one or more of smart contracts 1142. Data 1140 can include one or more pieces of information from data 1120. As used herein, "blockchain transaction" shall mean at least one hash and one or more pieces of information from a payslip that are recorded in a blockchain. The one or more pieces of information from the payslip may comprise data 1120. The at least one hash and the one or more pieces of information from the payslip that are recorded in the blockchain can be data 1140. The one or more pieces of information can comprise one or more of start date of pay period, end date of pay period, payment date, employee number, social security number, and other information printed on the payslip. A blockchain transaction can further comprise a signature. The signature can be signature 1128. The blockchain transaction with signature 1128 can be a transaction in transactions 1126.

Blockchain system 1102 determines whether one of smart contracts 1142, recorded within blockchain 1124, permits event 1112. Smart contracts 1142 determine whether event 1112 is permitted by executing code 1144, which can be code 1016 of FIG. 10.

Smart contracts have a number of desirable properties. Execution of a smart contract is managed automatically by a network. Documents are encrypted on a shared ledger that is duplicated many times over on different nodes of the network, ensuring that the data is true and correct. Because the smart contracts on distributed ledgers cannot be modified, they provide an immutable record of submitted workflow transactions that is highly resistant to post-transaction changes. Smart contracts automate progression tasks that were previously performed manually, thereby saving time, possibly many hours.

In one illustrative example, data 1120 of event 1112 includes a payslip verification. In this illustrative example, blockchain system 1102 determines whether smart contracts 1142 permit event 1112 by determining whether the employee is authorized payslip verification service. Responsive to determining that event 1112 is authorized for the employee, blockchain system 1102 permits event 1112.

Responsive to determining that smart contracts 1142 permit event 1112, blockchain system 1102 updates state 1146 of the account of the employee in blockchain system 1102 to reflect event 1112. Accounts 1148, including external accounts 1122, are state objects recorded in blockchain 1124. Blockchain system 1102 can set state 1146 of external accounts 1122 in response to determining that smart contracts 1142 permit event 1112 by user 1110. For example, upon determining that smart contracts 1142 permit event 1112, blockchain system 1102 may set state 1146 to indicate a verified state for user 1110.

Additionally, responsive to determining that the employee is permitted to perform the payslip verification event such as event 1112, blockchain system 1102 communicates event 1112 to service 1152 to record payslip verification information for the employee.

In this illustrative example, smart contracts 1142 can generate one or more additional ones of transactions 1126 in response to the execution of code 1144. These additional ones of transactions 1126 can be transactions that are sent to other ones of accounts 1148 in blockchain system 1102. For example, smart contracts 1142 may generate transactions 1126 addressed to one or more of external accounts 1122 associated with organization 1104. In this illustrative example, data 1140 of transactions 1126 generated by smart contracts 1142 can include payslip verification data relevant to the permitted one of event 1112.

Transactions 1126 generated by smart contracts 1142 can request external accounts 1122 to generate external events, such as push event 1150. In this illustrative example, push event 1150 communicates event 1112 to service 1152, enabling service 1152 to record payslip verification information for the employee.

In one illustrative example, service 1152 is associated with an account, such as one of external accounts 1122, of an employer, such as organization 1104, in blockchain system 1102. Blockchain system 1102 communicates event 1112 to service 1152 through push event 1150. Push event 1150 can be, for example, a web hook, a web socket, or some other appropriate communication that communicates payslip verification information to service 1152.

For example, blockchain system 1102 associates a URL address for service 1152 with the account of the employer in blockchain system 1102. In response to permitting event 1112, blockchain system 1102 pushes a POST request to service 1152. The POST request can comprise a JSON object that includes payslip verification information relevant to the permitted one of event 1112, such as data 1120 of event 1112.

The illustrative example in FIG. 11 and the examples in the other subsequent figures provide one or more technical solutions that address one or more technical problems that only exists in computers, particularly a network-centric system of computers. Specifically, blockchain system 1102 provides an immutable record of event 1112. In this manner, the use of blockchain system 1102 has a technical effect of reporting event 1112 using blockchain 1124, thereby reducing time, effort, or both in the accurate and extensive record-keeping necessary to effectively maintain records of employees' worked hours. In this manner, maintaining accurate records of event 1112 may be performed more efficiently as compared to currently used systems that do not include blockchain system 1102.

As a result, computer system 1108 operates as a special purpose computer system in which blockchain system 1102 in computer system 1108 records event 1112. Blockchain system 1102 receives a payslip verification event that identifies an account of an employee in blockchain system. Blockchain system 1102 records payslip verification event in a payslip verification blockchain. Blockchain system 1102 determines whether a smart contract recorded within blockchain system 1102 permits the payslip verification event. Responsive to determining that the smart contract permits the payslip verification event, blockchain system 1102 updates a state of the account of the employee in the blockchain system to reflect the payslip verification event such as event 1112. Responsive to determining that the employee is permitted to perform the payslip verification event, blockchain system 1102 communicates the payslip verification event to a payslip verification service, such as service 1152, to record payslip verification information for the employee.

Thus, blockchain system 1102 transforms computer system 1108 into a special purpose computer system as compared to currently available general computer systems that do not have blockchain system 1102. Currently used general computer systems do not provide an immutable record of a payslip verification event, such as event 1112, thereby reducing time, effort, or both in the accurate and extensive record-keeping necessary to effectively maintain records of employees' worked hours.

Figure 12:
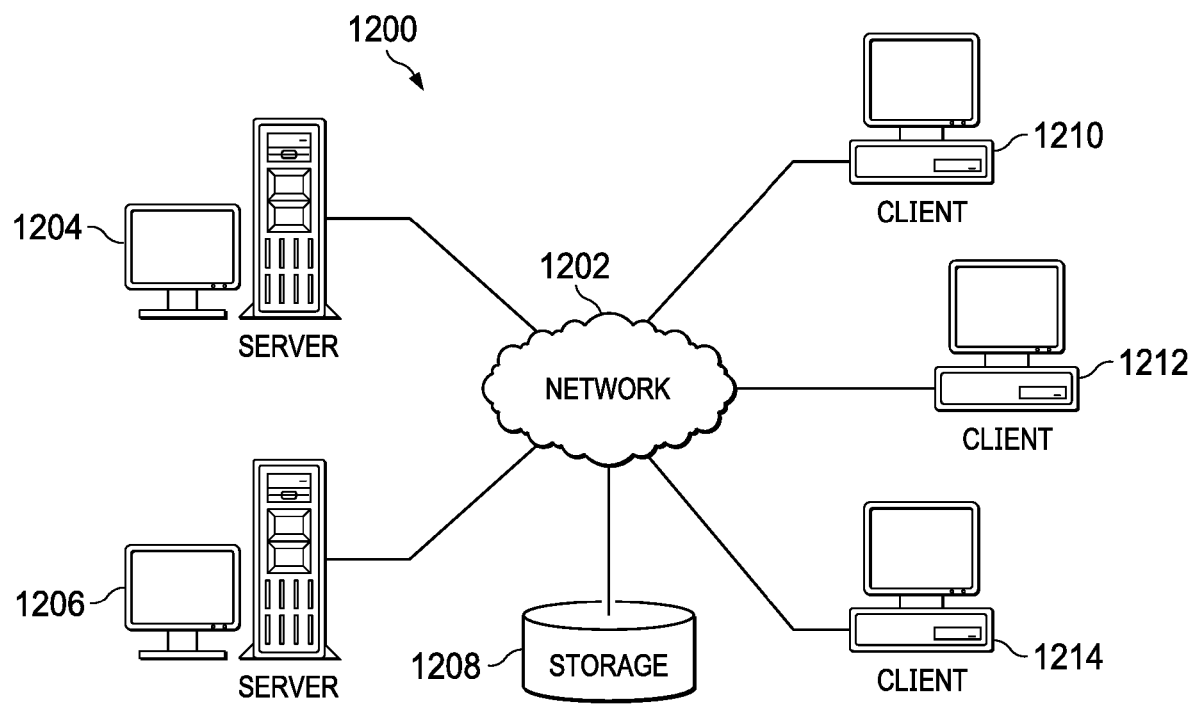
FIG. 12 is a block diagram of a computer network in accordance with an illustrative embodiment.

With reference now to FIG. 12, a pictorial representation of a network of data processing systems in which illustrative embodiments may be implemented is depicted. It should be appreciated that FIG. 12 is only provided as an illustration of one implementation and is not intended to imply any limitation with regard to the environments in which the different embodiments may be implemented. Many modifications to the depicted environments may be made.

The computer-readable program instructions may also be loaded onto a computer, a programmable data processing apparatus, or other device to cause a series of operational steps to be performed on the computer, programmable apparatus or other device to produce a computer implemented process, such that the instructions which execute on the computer, programmable apparatus, or other device implement the functions and/or acts specified in the flowchart and/or block diagram block or blocks.

Network data processing system 1200 is a network of computers in which the illustrative embodiments may be implemented. Network data processing system 1200 contains network 1202, which is the medium used to provide communications links between various devices and computers connected together within network data processing system 1300. Network 1202 may include connections, such as wire, wireless communication links, or fiber optic cables.

In the depicted example, server computer 1204 and server computer 1206 connect to network 1202 along with storage unit 1208. In addition, client computers include client computer 1210, client computer 1212, and client computer 1214. Client computer 1210, client computer 1212, and client computer 1214 connect to network 1202. These connections can be wireless or wired connections depending on the implementation. Client computer 1210, client computer 1212, and client computer 1214 may be, for example, personal computers or network computers. In the depicted example, server computer 1204 provides information, such as boot files, operating system images, and applications to client computer 1210, client computer 1212, and client computer 1214. Client computer 1210, client computer 1212, and client computer 1214 are clients to server computer 1204 in this example. Network data processing system 1200 may include additional server computers, client computers, and other devices not shown.

Program code located in network data processing system 1200 may be stored on a computer-recordable storage medium and downloaded to a data processing system or other device for use. For example, program code may be stored on a computer-recordable storage medium on server computer 1204 and downloaded to client computer 1210 over network 1202 for use on client computer 1210.

In the depicted example, network data processing system 1200 is the Internet with network 1202 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers consisting of thousands of commercial, governmental, educational, and other computer systems that route data and messages. Of course, network data processing system 1200 also may be implemented as a number of different types of networks, such as, for example, an intranet, a local area network (LAN), or a wide area network (WAN). FIG. 12 is intended as an example, and not as an architectural limitation for the different illustrative embodiments.

The illustration of network data processing system 1200 is not meant to limit the manner in which other illustrative embodiments can be implemented. For example, other client computers may be used in addition to or in place of client computer 1210, client computer 1212, and client computer 1214 as depicted in FIG. 12. For example, client computer 1210, client computer 1212, and client computer 1214 may include a tablet computer, a laptop computer, a bus with a vehicle computer, and other suitable types of clients.

In the illustrative examples, the hardware may take the form of a circuit system, an integrated circuit, an application-specific integrated circuit (ASIC), a programmable logic device, or some other suitable type of hardware configured to perform a number of operations. With a programmable logic device, the device may be configured to perform the number of operations. The device may be reconfigured at a later time or may be permanently configured to perform the number of operations. Programmable logic devices include, for example, a programmable logic array, programmable array logic, a field programmable logic array, a field programmable gate array, and other suitable hardware devices. Additionally, the processes may be implemented in organic components integrated with inorganic components and may be comprised entirely of organic components, excluding a human being. For example, the processes may be implemented as circuits in organic semiconductors.

Figure 13:
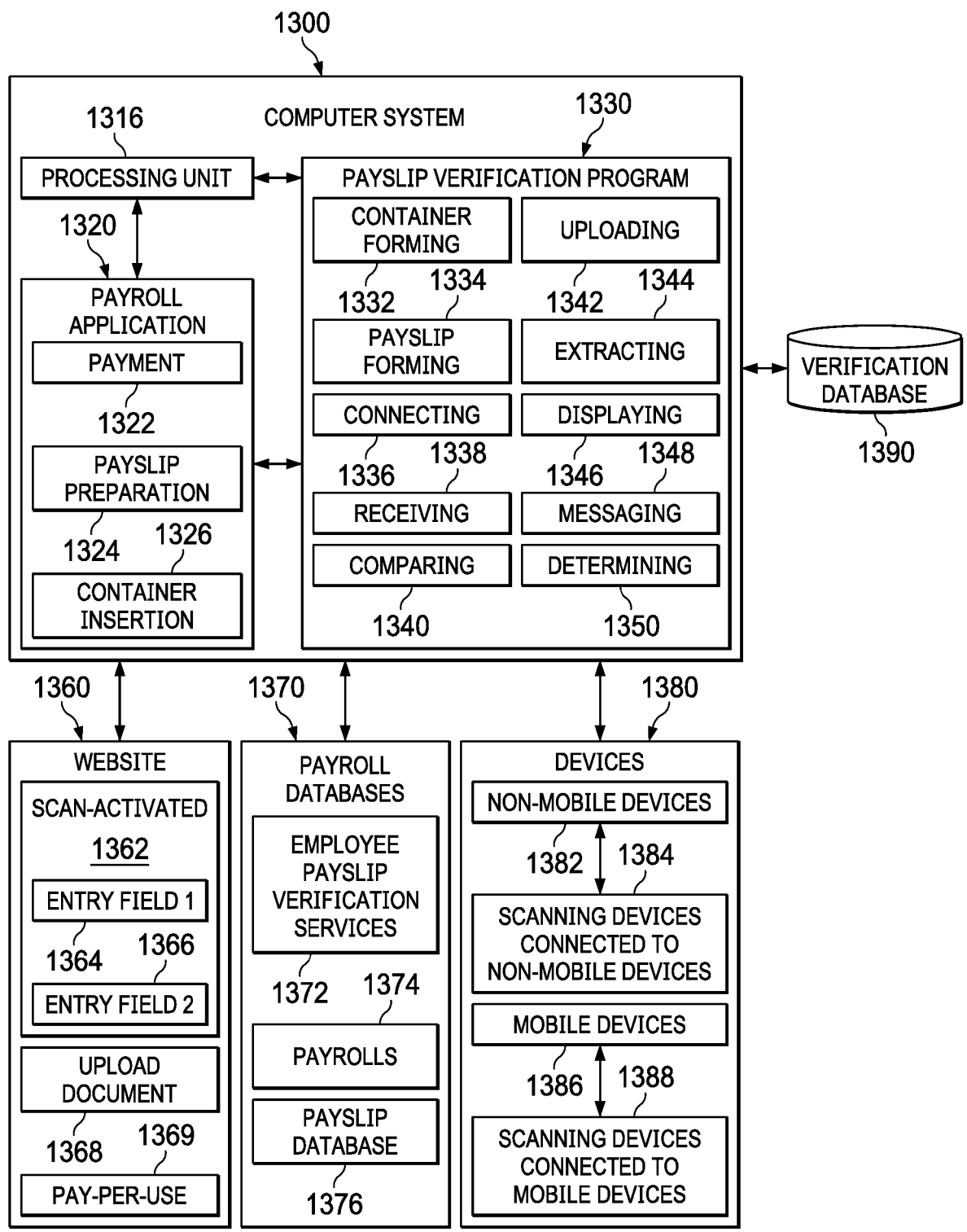
FIG. 13 is a block diagram of a computer system for payslip verification in accordance with an illustrative embodiment.

Turning to FIG. 13, a block diagram of a computer system for payslip verification is depicted in accordance with an illustrative embodiment. Computer system 1300 comprises processing unit 1316. Computer system 1300 may be network data processing system 1200 in FIG. 12 or data processing system 2000 in FIG. 20. Computer system 1300 may use one or more programs such as payslip verification program 1330 and payroll application 1320 in order to provide payslip verification by running on a processor unit such as processor unit 2104 in data processing system 2100 in FIG. 21.

Processing unit 1316 may be a processing unit such as processor unit 2104 in FIG. 21. Payroll application 1320 comprises payment 1322, payslip preparation 1324, and container insertion 1326. Payment 1322 may deliver actual payment to an employee according to a method of payment selected by the employee. Payslip preparation 1324 prepares the payslip for the particular payment made by payment 1322. Container insertion 1326 may insert a barcode into a payslip at the time of payslip preparation in accordance with container forming 1332 of payslip verification program 1330.

Payslip verification program 1330 comprises a number of programs: container forming 1332, payslip forming 1334, connecting 1336, receiving 1338, comparing 1340, uploading 1342, extracting 1344, displaying 1346, messaging 1348, and determining 1350. Container forming 1332 prepares a barcode for insertion into a payslip. The barcode may act as a pointer. The barcode may be stored in barcodes 1460 in FIG. 14 for insertion by payslip forming 1334 in payslip verification program 1330. The barcode may be a matrix barcode. The matrix barcode may contain a pointer for a website such as website 1360.

Figure 14:
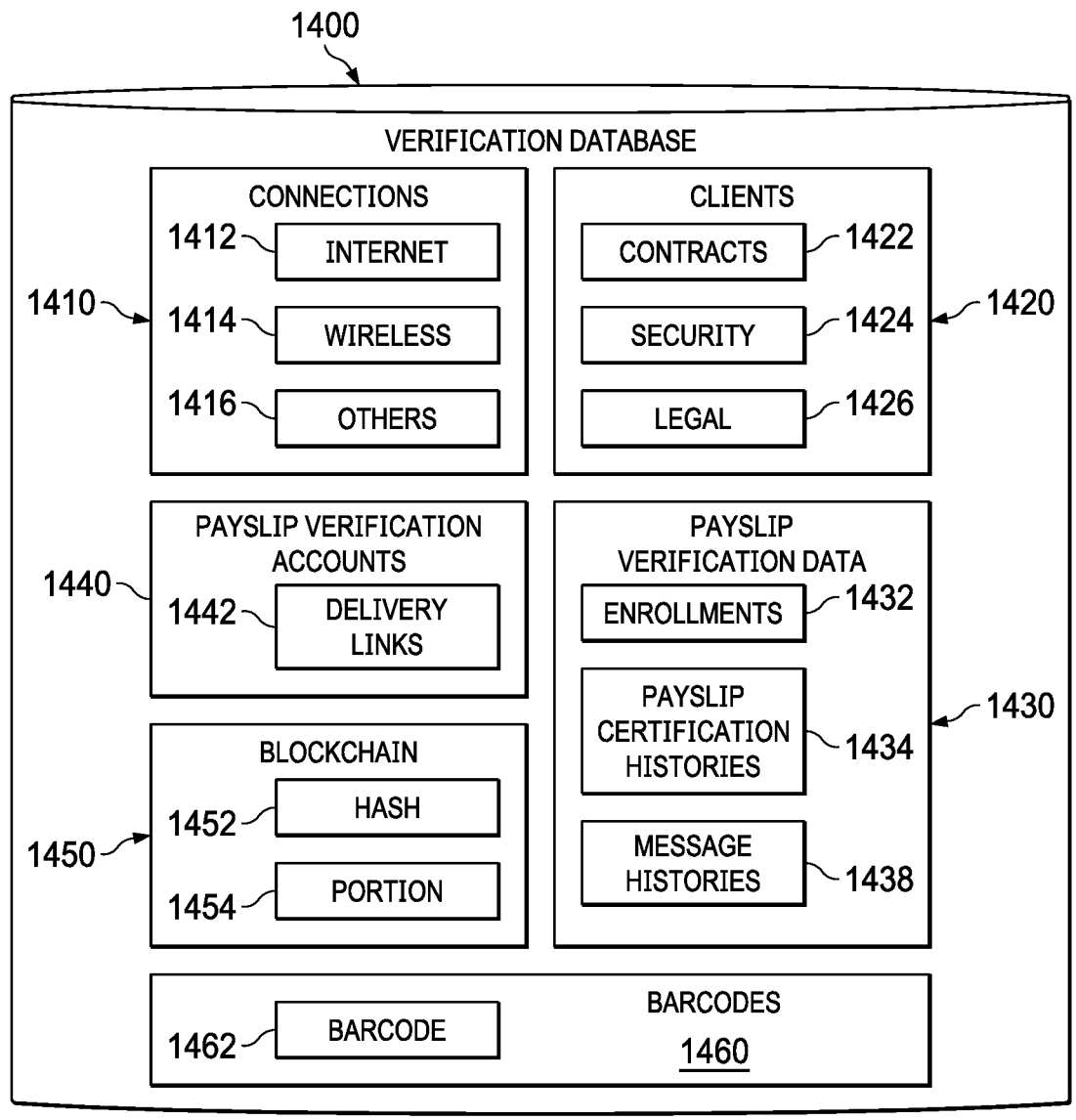
FIG. 14 is a block diagram of a verification database in accordance with an illustrative embodiment.

Payslip forming 1334 may insert a barcode into a payslip when an employee is enrolled in payroll verification services and is listed in enrollments 1432 in FIG. 14. Connecting 1336 may connect payslip verification program 1330 to processing unit 1316, payroll application 1320, website 1360, verification database 1390, devices 1380, and employee payslip verification services 1372. Connecting 1336 may use connections 1410 in FIG. 14. Connecting 1336 may use communications unit 2110 in FIG. 21. Receiving 1338 receives requests for verification when a barcode in a payslip is scanned by a requestor, and performs step 1810 in FIG. 18.

Receiving 1338 may also receive requests for verification by uploading a payslip that does not have a barcode embedded, and perform 1020 in FIG. 10. A website such as website 1360 can be activated when a barcode in a payslip is scanned by a requestor. When a barcode in a payslip is scanned, website 1360 may be displayed on a requestor's display. Website 1360 may further be activated by a requestor when a payslip does not have a barcode and a requestor may use upload document 1368 in order to upload an entire payslip. Activating may perform step 1830 in FIG. 18.

Displaying 1346 displays website 1360 and messages regarding verification. Displaying 1346 may perform step 1930 and step 1950 in FIG. 19 and step 2050 in FIG. 20. Comparing 1340 compares data entered on website 1360 to payroll data in payrolls 1374 in payroll databases 1370. The entered data may be from entry fields such as entry field 1 1364 and entry field 2 1366. Moreover, the entered data may be from an uploaded payslip using upload document 1368 in website 1360. Comparing 1340 performs step 1850 in FIG. 18 and step 2040 in FIG. 2000.

Determining 1350 determines whether data entered on website 1360 matches payroll data in payrolls 1374. Determining 1346 performs step 1930 and 1950 in FIG. 19 and step 2040 in FIG. 20. Messaging 1348 may send notifications to employees that verifications have been provided. Messaging 1348 may also send a verifiable payslip to an employee when an electronic payslip has been requested. Furthermore, messaging 1348 may send messages regarding verifications. Messaging 1348 may perform step 2030 and step 1950 in FIG. 19, and step 2050 and step 2060 in FIG. 20.

Uploading 1342 may provide for uploading of a payslip in response to upload document 1368 in website 1360. Extracting 1344 may extract data from an uploaded payslip so that the extracted data may be compared to corresponding payroll data in payrolls 1374. Uploading 1342 and extracting 1344 may be used when a payslip does not have an embedded barcode and payslip verification is desired. Uploading 1342 may perform step 2020 in FIG. 20. Extracting 1344 may perform step 2020 in FIG. 20.

Computer system 1300 is connected to payroll databases 1370. Payroll databases 1370 comprise employee payslip verification services 1372, payrolls 1374, and payslip database 1376. Payroll databases 1370 exist outside of the blockchain, such that employee payslip verification services 1372, payrolls 1374, and payslip database 1376 are stored at an off-blockchain location.

Computer system 1300 is connected to devices 1380. Devices 1380 comprise non-mobile devices 1382, scanning devices connected to non-mobile devices 1384, mobile devices 1386, and scanning devices connected to mobile devices 1388.

Computer system 1300 is connected to website 1360. Website 1360 may comprise scan-activated 1362. Scan-activated 1362 may comprise a number of fields for data entry such as entry field 1 1364 and entry field 2 1366. Website 1360 may comprise an upload document 1368 for uploading a document. Web site 1360 may comprise pay-per-use 1369 by which a user who is not a subscriber to employee payslip verification services 1372 may select a pay-per-use option. Computer system 1300 may be connected to payroll databases 1370. Payroll databases 1370 may comprise verification database 1400 in FIG. 14.

As a result, computer system 1300 operates as a special purpose computer system for payslip verification. Thus, payslip verification program 1330 makes computer system 1300 a special purpose computer system as compared to currently available general computer systems that do not have a means to perform the functions of computer system 1300 of FIG. 13 described herein and as further described in FIGS. 17-20.

Moreover, currently used general computer systems do not provide a data processing system such as processing unit 1316 configured by the processes in FIGS. 17-20.

Turning to FIG. 14, a block diagram of a verification database in depicted in accordance with an illustrative embodiment. Database 1400 may be verification database 1390 in FIG. 13. Verification database 1400 comprises connections 1410, clients 1420, payslip verification data 1430, payslip verification accounts 1440, and blockchain 1450. Connections 1410 may further comprise internet 1412, wireless 1414, and others 1416. Clients 1420 may further comprise contracts 1422, security 1424, and legal 1426. Payslip verification data 1430 may further comprise enrollments 1432, payslip certification histories 1434, and message histories 1438. Payslip certification histories 1434 comprises a history of payroll verifications. Blockchain 1450 may provide barcodes 1460 for validation of payslips. Barcode 1462 in barcodes 1460 may be inserted into a payslip by container insertion 1326 in FIG. 13.

Figure 15:
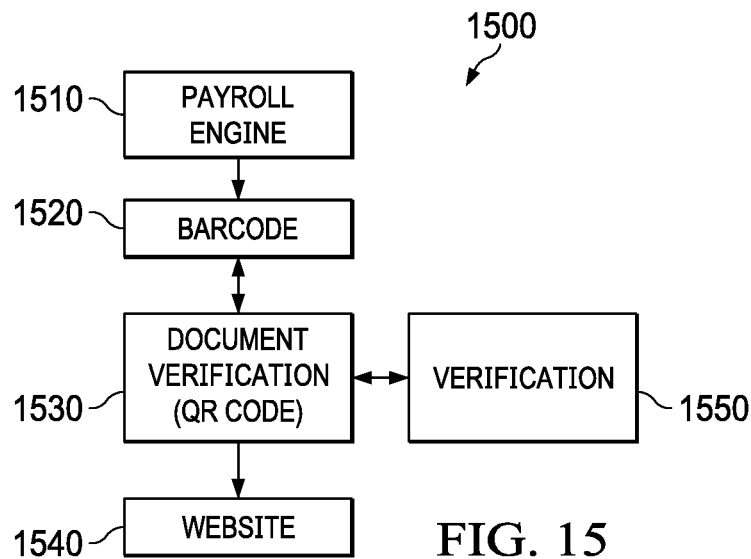
FIG. 15 is a schematic of a verification system in accordance with an illustrative embodiment.

Turning to FIG. 15, a schematic of a system for payslip verification is depicted in accordance with an illustrative embodiment. System 1500 comprises payroll engine 1510, barcode 1520, document verification (QR code) 1530, website UX 1540, and verification 1550. Payroll engine 1510 may comprise container insertion 1326 of payroll application 1320 in FIG. 13. Document certification (QR code) 1430 in FIG. 14 may be performed when the barcode is scanned by a device, such as scanning devices connected to non-mobile devices 1384 and scanning devices connected to mobile devices 1388 in FIG. 13, so that website 1540 is displayed on a requestor's display. Website 1540 may be website 1360 in FIG. 13. Document verification (QR code) 1530 may comprise comparing data received from website 1540 with payroll data such as payrolls 1374 from payroll databases 1370 in FIG. 13. Alternatively, a payslip may be uploaded to website 1540. Document verification (QR code) 1530 may perform steps such as step 1930 and step 1950 in FIG. 19 and step 2040 in FIG. 20. If the data from the payslip matches corresponding data from the database, a message of verification, such as verification 1550, may be sent. Messaging associated with verification 1550 may be performed by messaging 1348 in FIG. 13 and may perform step 1930 and step 1950 in FIG. 19 and step 2050 and step 2060 in FIG. 20.

Figure 16:
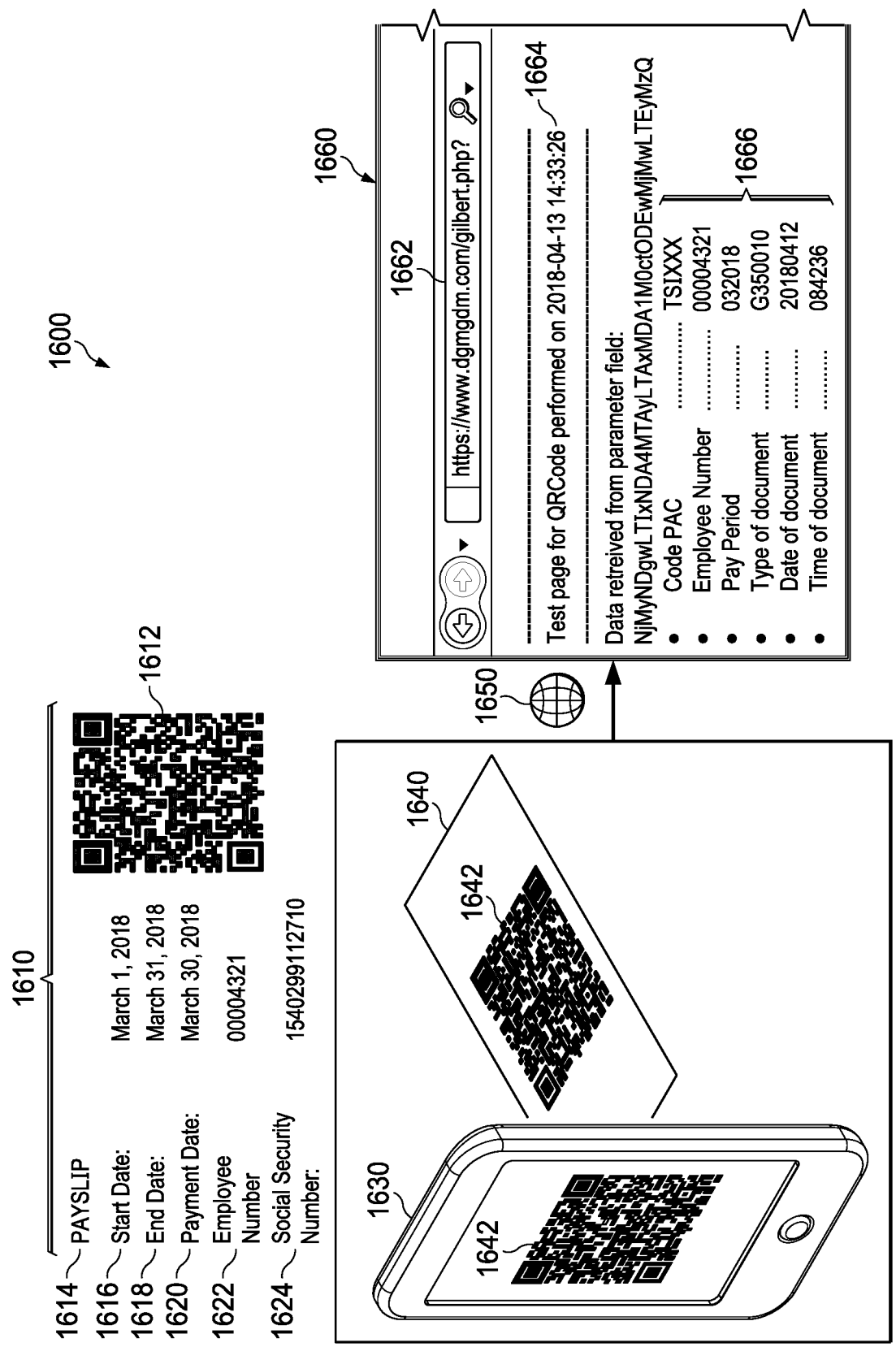
FIG. 16 is a depiction of a payslip verification system in accordance with an illustrative embodiment.

Turning to FIG. 16, an illustration of a payslip verification system is depicted in accordance with an illustrative embodiment. Payslip verification system 1600 comprises smart phone 1630 with display 1642. Payslip 1610 is depicted with payslip data along with barcode 1612. Payslip 1610 includes title (payslip) 1614, start date of pay period 1616, end date of pay period 1618, payment date 1620, employee number 1622, and social security number 1624. Payslip 1610 can be a digital payslip, or can be printed on paper.

When barcode 1612 of payslip 1610 is scanned, a request is sent over World Wide Web 1650 and data is retrieved from parameter fields. Retrieved data 1660 is shown with title 1664 and data 1666. URL address 1662 is depicted in retrieved data 1660. Barcode 1642 may be barcode 1612. Barcode 1642 may be scanned from smart phone 1630 or from payslip 1640.

Figure 17:
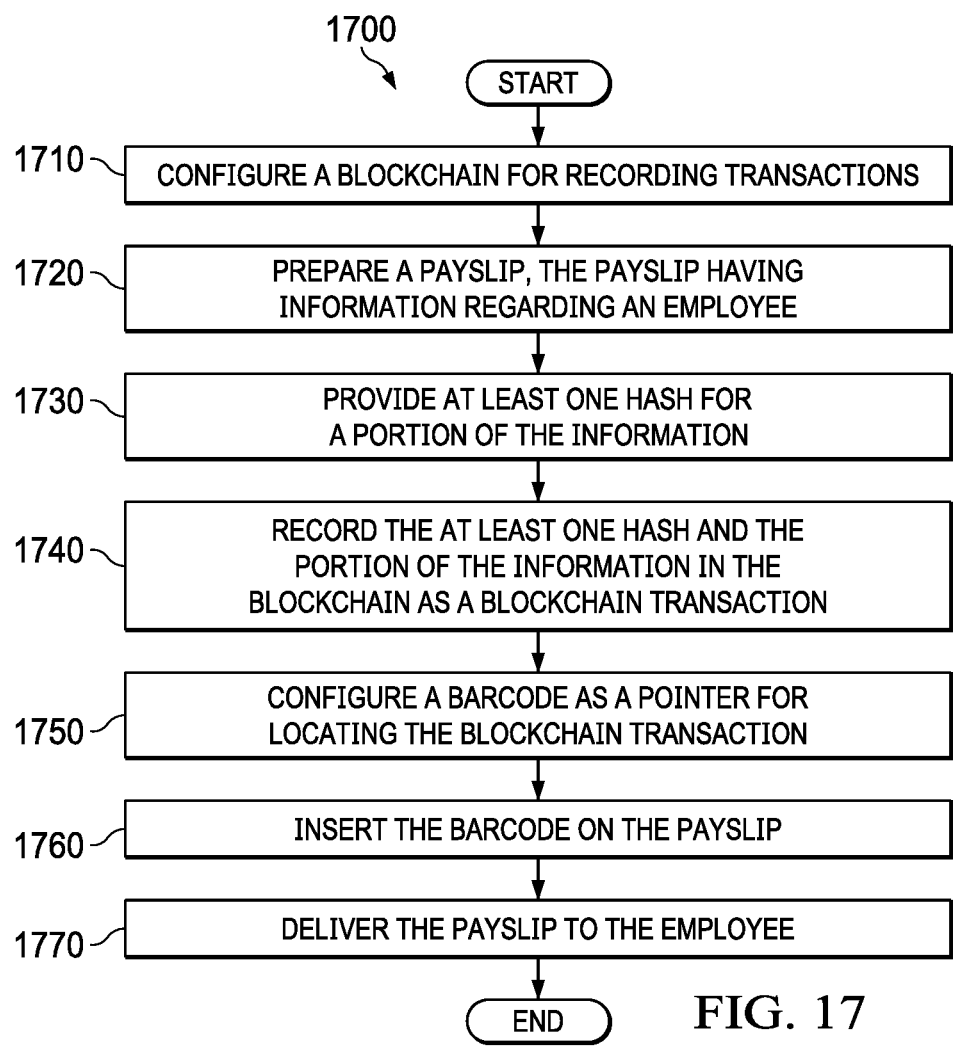
FIG. 17 is an illustration of a flowchart of a process for payslip verification in accordance with an illustrative embodiment.

Turning to FIG. 17, a flowchart of a process for payslip verification is depicted in accordance with an illustrative embodiment. Process 1700 can be implemented in software, hardware, or a combination of the two. When software is used, the software comprises program code that can be loaded from a storage device and run by a processor unit in a computer system such as computer system 1300 in FIG. 13. Computer system 1300 may reside in a network data processing system such as network data processing system 1200 in FIG. 12. For example, computer system 1300 may reside on one or more of server computer 1204, server computer 1206, client computer 1210, client computer 1212, and client computer 1214 connected by network 1202 in FIG. 12. Moreover, process 1700 can be implemented by data processing system 2100 in FIG. 21 and a processor unit such as processor unit 2104 in FIG. 21.

Process 1700 starts. A blockchain is configured for recording transactions (step 1710). The blockchain may be blockchain 1450 in FIG. 14. A payslip is prepared (step 1720). The payslip has information regarding an employee. At least one hash is provided for a portion of the information (step 1730). The at least one hash may be hash 1452 in FIG. 14. The portion may be portion 1454 in FIG. 14. The at least one hash and the portion of the information is recorded in the blockchain as a blockchain transaction (step 1740). A barcode is configured to act as a pointer for locating the blockchain transaction (step 1750). The barcode may be barcode 1462 in FIG. 14. The barcode may one of barcodes 1460 in FIG. 14. The barcode may be barcode 1520 in FIG. 15. The barcode is inserted on the payslip (step 1760). In an embodiment, the barcode can be inserted into a barcode location on the payslip. The payslip is delivered to the employee (step 1770). Process 1700 ends.

Figure 18:
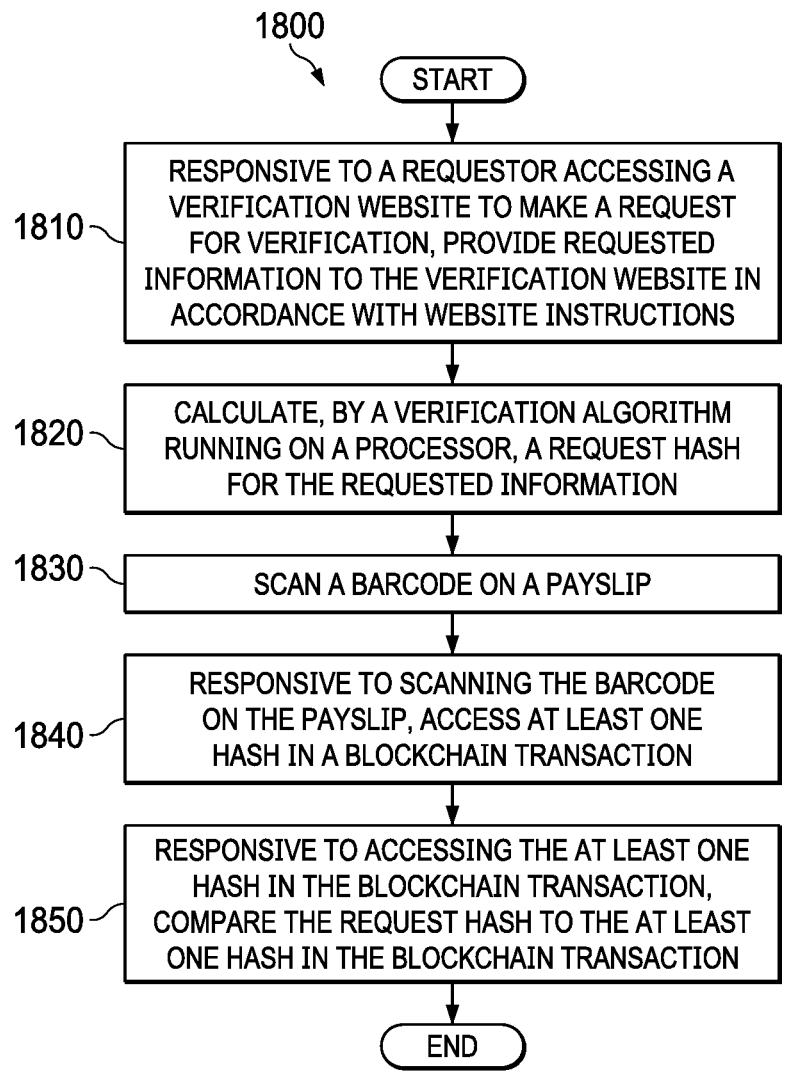
FIG. 18 is an illustration of a flowchart of a process for payslip verification in accordance with an illustrative embodiment.

Turning to FIG. 18, a flowchart of a process for payslip verification is depicted in accordance with an illustrative embodiment. Process 1800 can be implemented in software, hardware, or a combination of the two. When software is used, the software comprises program code that can be loaded from a storage device and run by a processor unit in a computer system such as computer system 1300 in FIG. 13. Computer system 1300 may reside in a network data processing system such as network data processing system 1200 in FIG. 12. For example, computer system 1300 may reside on one or more of server computer 1204, server computer 1206, client computer 1210, client computer 1212, and client computer 1214 connected by network 1202 in FIG. 12. Moreover, process 1800 can be implemented by data processing system 2100 in FIG. 21 and a processor unit such as processor unit 2104 in FIG. 21.

Process 1800 starts. Responsive to a requestor accessing a verification website to make a request for verification, requested information is provided to the verification website in accordance with website instructions (step 1810). The verification website may be website 1360 in FIG. 13. A verification algorithm running on a processor calculates a request hash for the requested information (step 1820). A barcode on a payslip is scanned (step 1830). The barcode may be barcode 1612 or barcode 1642 in FIG. 16. The barcode can be on a location on the payslip. The barcode can be scanned by a scanner connected to the processor. The barcode may be scanned by one of scanning devices connected to non-mobile devices 1384 and scanning devices connected to mobile devices 1388 in FIG. 13. Responsive to scanning the barcode location on the payslip, at least one hash in a blockchain transaction is accessed (step 1840). The at least one hash in the blockchain transaction may be hash 1452 in FIG. 14. The at least one hash can be the at least one hash provided in step 1730 of FIG. 17 and recorded in step 1740 of FIG. 17. Responsive to accessing the at least one hash in the blockchain transaction, the request hash is compared to the at least one hash in the blockchain transaction (step 1850). Comparing may be performed by comparing 1340 in FIG. 13. Process 1800 ends.

Figure 19:
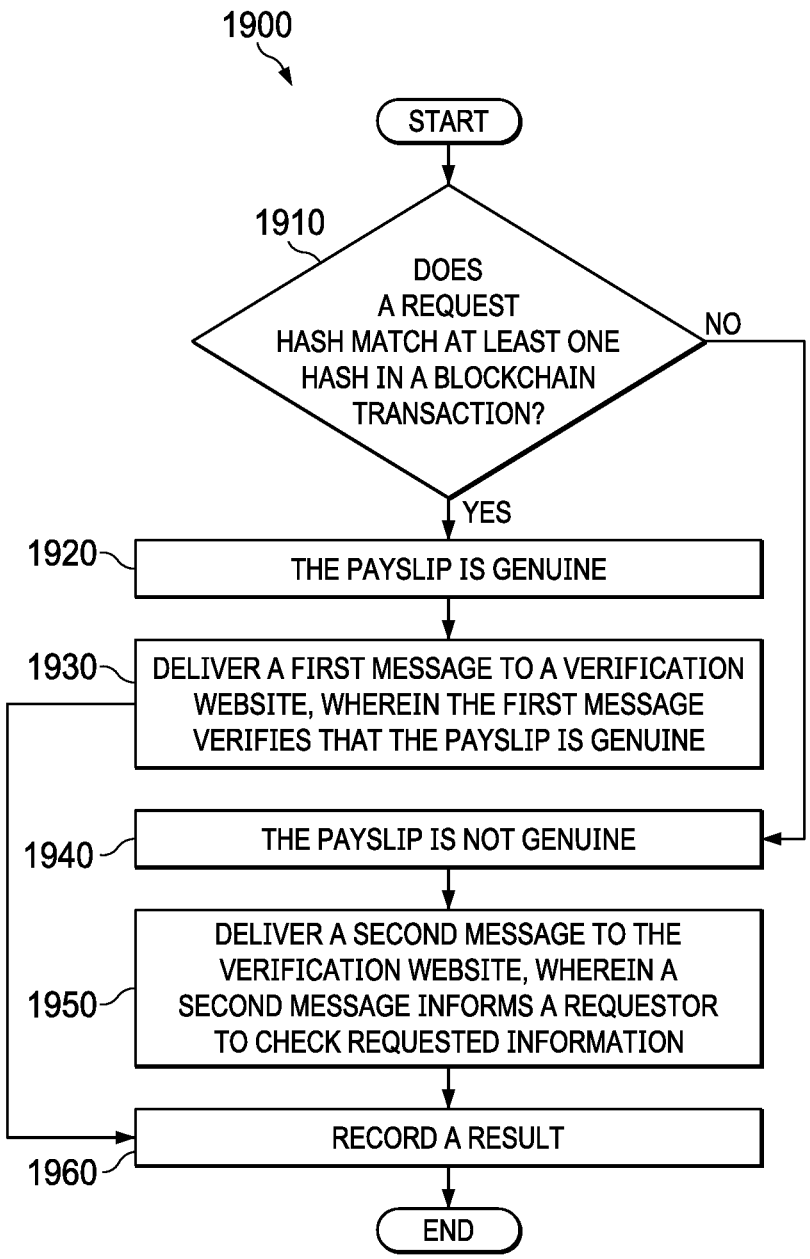
FIG. 19 is a flowchart of a process for messaging for payslip verification in accordance with an illustrative embodiment.

Turning to FIG. 19, a flowchart of a process for requesting and receiving payslip verification is depicted in accordance with an illustrative embodiment. Process 1900 can be implemented in software, hardware, or a combination of the two. When software is used, the software comprises program code that can be loaded from a storage device and run by a processor unit in a computer system such as computer system 1300 in FIG. 13. Computer system 1300 may reside in a network data processing system such as network data processing system 1200 in FIG. 12. For example, computer system 1300 may reside on one or more of server computer 1204, server computer 1206, client computer 1210, client computer 1212, and client computer 1214 connected by network 1202 in FIG. 12. Moreover, process 1900 can be implemented by data processing system 2100 in FIG. 21 and a processing unit such as processor unit 2104 in FIG. 21.

Process 1900 starts. A determination is made as to whether a request hash matches at least one hash in a blockchain transaction (step 1910). The at least one hash in the blockchain transaction may be hash 1452 in FIG. 14. If the request hash matches the at least one hash in the blockchain transaction the payslip is genuine (step 1920). The determination may be made by determining 1350 in FIG. 13. A first message is delivered to a verification website wherein the first message verifies that the payslip is genuine (step 1930). Process 1900 goes to step 1960. A result is recorded (step 1960). The result recorded is that the payslip is genuine. Process 1900 ends. If at step 1910, the request hash does not match the at least one hash in the blockchain transaction, the payslip is not a genuine payslip (step 1940). A second message is delivered to the verification website wherein the second message informs the requestor to check the requested information (step 1950). Afterwards, a result is recorded (step 1960). The result recorded is that the payslip is not a genuine payslip. Process 1900 ends.

Figure 20:
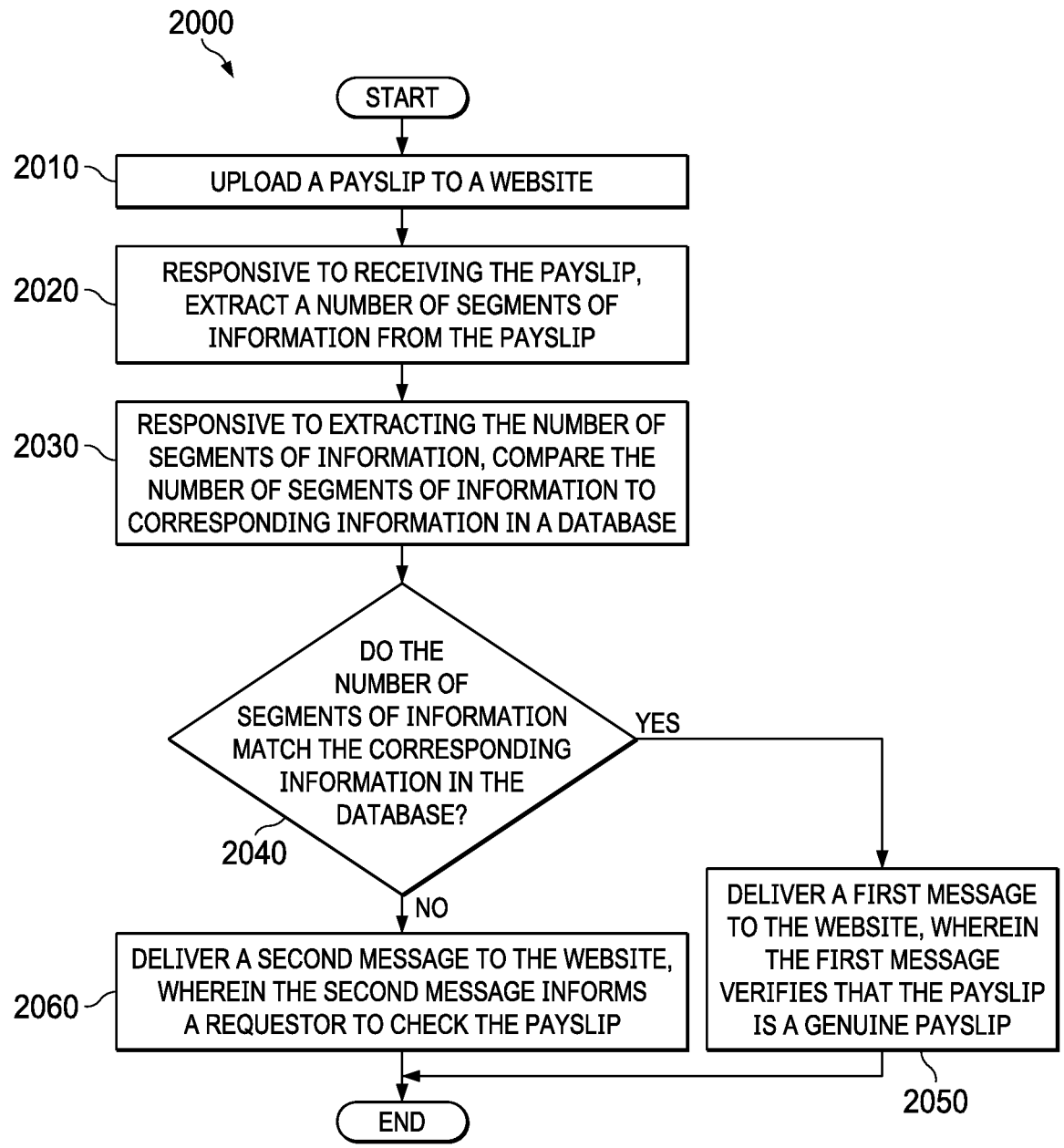
FIG. 20 is a flowchart of a process for verifying a payslip by scanning an entire payslip that does not have a barcode embedded in accordance with an illustrative embodiment.
Figure 21:
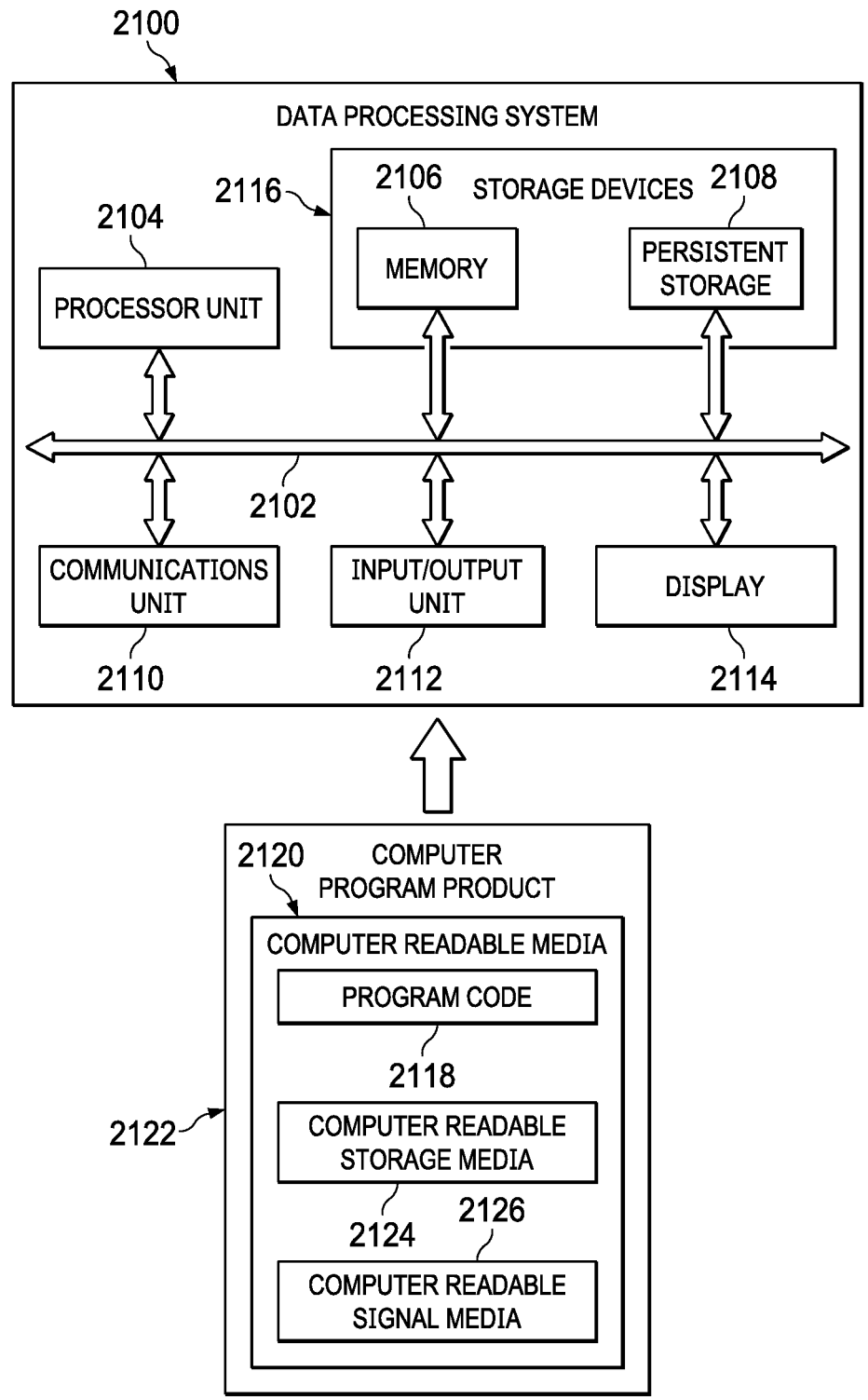
FIG. 21 is a block diagram of a data processing system depicted in accordance with an illustrative embodiment.

Turning to FIG. 20, a flowchart of a process for verifying a payslip by scanning an entire payslip that does not have a barcode embedded is depicted in accordance with an illustrative embodiment. Process 2000 can be implemented in software, hardware, or a combination of the two. When software is used, the software comprises program code that can be loaded from a storage device and run by a processor unit in a computer system such as computer system 1300 in FIG. 13. Computer system 1300 may reside in a network data processing system such as network data processing system 1200 in FIG. 12. For example, computer system 1300 may reside on one or more of server computer 1204, server computer 1206, client computer 1210, client computer 1212, and client computer 1214 connected by network 1202 in FIG. 12. Moreover, process 2000 can be implemented by data processing system 2100 in FIG. 21 and a processor unit such as processor unit 2104 in FIG. 21.

Process 2000 starts. A payslip is uploaded to a website (step 2010). The payslip may be scanned by one of scanning devices connected to non-mobile devices 1384 and scanning devices connected to mobile devices 1388 in FIG. 13. The payslip may be uploaded by upload document 1368 in website 1360 in FIG. 13. Responsive to receiving the payslip, a number of segments of information are extracted from the payslip (step 2020). Responsive to extracting the number of segments of information, the number of segments of information is compared to corresponding information in a database (step 2030). The corresponding information can be in a source located in the database. The source may be payslip database 1376 in payroll databases 1370 in FIG. 13. Comparing may be performed by comparing 1340 in FIG. 13. A determination is made whether the number of segments of information match the corresponding information in the database (step 2040). The determination may be performed by determining 1350 in FIG. 13. If at step 2040 the number of segments of information are determined to match the corresponding information in the database, process 2000 goes to step 2050. A first message is delivered to the website, wherein the first message verifies that the payslip is a genuine payslip (step 2050). After step 2050, process 2000 ends. If at step 2040 the number of segments of information are determined to not match the corresponding information in the database, process 2000 goes to step 2060. A second message is delivered to the website, wherein the second message informs a requestor to check the payslip (step 2060). After step 2060, process 2000 ends.

Turning now to FIG. 21, an illustration of a block diagram of a data processing system is depicted in accordance with an illustrative embodiment. Data processing system 2100 may be used to implement one or more computers and computer system 1212 in FIG. 12. In this illustrative example, data processing system 2100 includes communications framework 2102, which provides communications between processor unit 2204, memory 2106, persistent storage 2108, communications unit 2110, input/output unit 2112, and display 2114. In this example, communications framework 2102 may take the form of a bus system.

Processor unit 2104 serves to execute instructions for software that may be loaded into memory 2106. Processor unit 2104 may be a number of processors, a multi-processor core, or some other type of processor, depending on the particular implementation. Memory 2106 and persistent storage 2108 are examples of storage devices 2116. A storage device is any piece of hardware that is capable of storing information, such as, for example, without limitation, at least one of data, program code in functional form, or other suitable information either on a temporary basis, a permanent basis, or both on a temporary basis and a permanent basis. Storage devices 2116 may also be referred to as computer-readable storage devices in these illustrative examples. Memory 2106, in these examples, may be, for example, a random access memory or any other suitable volatile or non-volatile storage device. Persistent storage 2108 may take various forms, depending on the particular implementation.

For example, persistent storage 2108 may contain one or more components or devices. For example, persistent storage 2108 may be a hard drive, a flash memory, a rewritable optical disk, a rewritable magnetic tape, or some combination of the above. The media used by persistent storage 2108 also may be removable. For example, a removable hard drive may be used for persistent storage 2108. Communications unit 2110, in these illustrative examples, provides for communications with other data processing systems or devices. In these illustrative examples, communications unit 2110 is a network interface card.

Input/output unit 2112 allows for input and output of data with other devices that may be connected to data processing system 2100. For example, input/output unit 2112 may provide a connection for user input through at least of a keyboard, a mouse, or some other suitable input device. Further, input/output unit 2112 may send output to a printer. Display 2114 provides a mechanism to display information to a user.

Instructions for at least one of the operating system, applications, or programs may be located in storage devices 2116, which are in communication with processor unit 2104 through communications framework 2102. The processes of the different embodiments may be performed by processor unit 2104 using computer-implemented instructions, which may be located in a memory, such as memory 2106.

These instructions are referred to as program code, computer-usable program code, or computer-readable program code that may be read and executed by a processor in processor unit 2104. The program code in the different embodiments may be embodied on different physical or computer-readable storage media, such as memory 2106 or persistent storage 2108.

Program code 2124 is located in a functional form on computer-readable media 2120 that is selectively removable and may be loaded onto or transferred to data processing system 2100 for execution by processor unit 2104. Program code 2118 and computer-readable media 2124 form computer program product 2122 in these illustrative examples. In one example, computer-readable media 2120 may be computer-readable storage media 2124 or computer-readable signal media 2126.

In these illustrative examples, computer-readable storage media 2124 is a physical or tangible storage device used to store program code 2118 rather than a medium that propagates or transmits program code 2118. Alternatively, program code 2118 may be transferred to data processing system 2100 using computer-readable signal media 2126.

Computer-readable signal media 2126 may be, for example, a propagated data signal containing program code 2118. For example, computer-readable signal media 2126 may be at least one of an electromagnetic signal, an optical signal, or any other suitable type of signal. These signals may be transmitted over at least one of communications links, such as wireless communications links, optical fiber cable, coaxial cable, a wire, or any other suitable type of communications link.

The different components illustrated for data processing system 2100 are not meant to provide architectural limitations to the manner in which different embodiments may be implemented. The different illustrative embodiments may be implemented in a data processing system including components in addition to or in place of those illustrated for data processing system 2100. Other components shown in FIG. 21 can be varied from the illustrative examples shown. The different embodiments may be implemented using any hardware device or system capable of running program code 2118.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step. For example, one or more of the blocks may be implemented as program code.

In some alternative implementations of an illustrative embodiment, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added in addition to the illustrated blocks in a flowchart or block diagram.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component may be configured to perform the action or operation described. For example, the component may have a configuration or design for a structure that provides the component an ability to perform the action or operation that is described in the illustrative examples as being performed by the component.

Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A computer-implemented method for reducing fraud based on a forged or altered payslip, the computer-implemented method comprising:
   configuring a blockchain for recording transactions;
   preparing a payslip, the payslip having information regarding an employee, the information comprising a start date of pay period, an end date of pay period, a payment date, an employee number, and a social security number;
   providing at least one hash for at least one portion of the information;
   recording the at least one hash in the blockchain as a blockchain transaction;
   configuring a barcode as a pointer for locating the blockchain transaction; responsive to configuring the barcode, inserting the barcode on the payslip;
   delivering the payslip to the employee;
   responsive to a requestor accessing a verification website to make a request for verification, providing requested information to the verification website in accordance with website instructions;
   calculating, by a verification algorithm running on a processor, a request hash for the requested information;
   responsive to scanning the barcode on the payslip, accessing the at least one hash in the blockchain transaction;
   responsive to accessing the at least one hash in the blockchain transaction, comparing the request hash to the at least one hash in the blockchain transaction;
   responsive to the request hash matching the at least one hash in the blockchain transaction, verifying that the payslip is genuine;
   responsive to verifying that the payslip is genuine, delivering a first message to the verification website wherein the first message verifies that the payslip is genuine; and
   recording a result.

2. The computer-implemented method of claim 1, further comprising:
   responsive to the request hash not matching the at least one hash in the blockchain transaction, determining that the payslip is not a genuine payslip;
   responsive to determining that the payslip is not genuine, delivering a second message to the verification website wherein the second message informs the requestor to check the requested information; and
   recording a result.

3. The computer-implemented method of claim 2, further comprising:
   storing the at least one portion of the information in the payslip at an off-blockchain location.

4. The computer-implemented method of claim 3, wherein the off-blockchain location comprises a source in a database.

5. The computer-implemented method of claim 2, wherein the pay slip is a digital payslip.

6. The computer-implemented method of claim 2, wherein the pay slip is printed on paper.

7. The computer-implemented method of claim 1, wherein the verification website is configured to provide a pay-per-use service to the requestor, and wherein the pay-per-use service includes providing a history of verification.

8. An apparatus for payslip verification, the apparatus comprising:
   a computer system connected to a blockchain and to a verification website; and a computer-readable storage medium having program code stored thereon, wherein the program code is configured to cause a processor unit to configure the blockchain for:
recording transactions;
preparing a payslip, the payslip having information regarding an employee, the information comprising a start date of pay period, an end date of pay period, a payment date, an employee number, and a social security number;
providing at least one hash for a portion of the information;
recording the at least one hash and the portion of the information in the blockchain as a blockchain transaction;
responsive to configuring a barcode as a pointer for locating the blockchain transaction, to insert the barcode into a barcode location on the payslip in response to configuring the barcode;
delivering the payslip to the employee;
responsive to a requestor accessing the verification website to make a request for verification, providing requested information to the verification website in accordance with website instructions;
calculating, by a verification algorithm running on a processor, a request hash for the requested information;
responsive to a scan of the barcode location on the payslip, accessing the at least one hash in the blockchain transaction;
responsive to accessing the at least one hash in the blockchain transaction, comparing the request hash to the at least one hash in the blockchain transaction;
responsive to the request hash matching the at least one hash in the blockchain transaction, verifying that the payslip is a genuine payslip;
responsive to verifying that the payslip is the genuine payslip, delivering a first message to the verification website wherein the first message verifies that the payslip is genuine; and
recording a result.

9. The apparatus of claim 8, further comprising:
program code stored in the computer-readable storage medium and configured to cause the processor unit to:
responsive to the request hash not matching the at least one hash in the blockchain transaction, determining that the payslip is not a genuine payslip;
responsive to determining that the payslip is not genuine, deliver a second message to the verification website wherein the second message informs the requestor to check the requested information; and
record a result.

10. A computer program product for reducing fraud based on a forged or altered payslip, the computer program product comprising:
program code stored in a computer-readable storage medium and configured to cause a processor unit to configure a blockchain for recording transactions;
program code stored in the computer-readable storage medium and configured to cause the processor unit to prepare a payslip, the payslip having information regarding an employee, the information comprising a start date of pay period, an end date of pay period, a payment date, an employee number, and a social security number;

program code stored in the computer-readable storage medium and configured to cause the processor unit to provide at least one hash for a portion of the information;
program code stored in the computer-readable storage medium and configured to cause the processor unit to record the at least one hash and the portion of the information in the blockchain as a blockchain transaction;
program code stored in the computer-readable storage medium and configured to cause the processor unit to configure a barcode as a pointer for locating the blockchain transaction;
program code stored in the computer-readable storage medium and configured to cause the processor unit, to insert the barcode into a barcode location on the payslip in response to configuring the barcode;
program code stored in the computer-readable storage medium and configured to cause the processor unit to deliver the payslip to the employee;
program code stored in the computer-readable storage medium and configured to cause the processor unit, responsive to a requestor accessing a verification website to make a request for verification, providing requested information to the verification website in accordance with website instructions;
program code stored in the computer-readable storage medium and configured to cause the processor unit to calculate, by a verification algorithm running on a processor, a request hash for the requested information;
program code stored in the computer-readable storage medium and configured to cause the processor unit, responsive to scanning the barcode location on the payslip, to access the at least one hash in the blockchain transaction;
program code stored in the computer-readable storage medium and configured to cause the processor unit, responsive to accessing the at least one hash in the blockchain transaction, comparing the request hash to the at least one hash in the blockchain transaction;
program code stored in the computer-readable storage medium and configured to cause the processor unit, responsive to the request hash matching the at least one hash in the blockchain transaction, verifying that the payslip is a genuine payslip;
program code stored in the computer-readable storage medium and configured to cause the processor unit, responsive to verifying that the payslip is the genuine payslip, to deliver a first message to a website wherein the first message verifies that the payslip is genuine; and
program code stored in the computer-readable storage medium and configured to cause the processor unit to record a result.

11. The computer program product of claim 10, further comprising:
program code stored in the computer-readable storage medium and configured to cause the processor unit, responsive to the request hash not matching the at least one hash in the blockchain transaction, determining that the payslip is not a genuine payslip;
program code stored in the computer-readable storage medium and configured to cause the processor unit, responsive to determining that the payslip is not genuine, to deliver a second message to the verification website wherein the second message informs the requestor to check the requested information; and program code stored in the computer-readable storage medium and configured to cause the processor unit, to record a result.

* * * * *